United States Patent [19]
Divan et al.

[11] Patent Number: 5,341,280
[45] Date of Patent: * Aug. 23, 1994

[54] CONTACTLESS COAXIAL WINDING TRANSFORMER POWER TRANSFER SYSTEM

[75] Inventors: Deepakraj M. Divan, Madison; Keith W. Klontz, Sun Prairie; Donald W. Novotny; Robert D. Lorenz, both of Madison, all of Wis.

[73] Assignee: Electric Power Research Institute, Palo Alto, Calif.

[*] Notice: The portion of the term of this patent subsequent to Oct. 20, 2009 has been disclaimed.

[21] Appl. No.: 767,024
[22] Filed: Sep. 27, 1991
[51] Int. Cl.$^5$ .................. H02M 5/453; H02J 7/00
[52] U.S. Cl. ........................... 363/37; 320/2; 320/21; 336/118; 336/175; 336/DIG. 2
[58] Field of Search ............... 363/37; 336/118, 119, 336/129, 175, 176, 178, DIG. 2; 362/164, 391; 324/392, 395, 402; 320/22, 21; H02M 5/453

[56] References Cited

U.S. PATENT DOCUMENTS

| | | |
|---|---|---|
| 2,375,591 | 5/1945 | Schweitzer, Jr. . |
| 3,870,942 | 3/1975 | Boese et al. . |
| 3,996,543 | 12/1976 | Conner et al. . |
| 4,386,280 | 5/1983 | Ricaud et al. ............... 336/176 X |
| 4,496,821 | 1/1985 | Burgher et al. . |
| 4,656,412 | 4/1987 | McLyman . |
| 4,901,069 | 2/1990 | Veneruso ............... 336/129 X |
| 4,913,258 | 4/1990 | Sakurai et al. . |
| 4,953,726 | 9/1990 | Loutan . |
| 5,157,319 | 10/1992 | Klontz et al. ............... 320/2 |

OTHER PUBLICATIONS

E. T. Bowers, "Safety Aspects of Pneumatic Transport," Bureau of Mines Information Circular No. 9006, U.S. Dept. of Interior, pp. 6-20, 1985.
K. Lashkari, S. E. Schladover, and E. H. Lechner, "Inductive Power Transfer to an Electric Vehicle," 8th International Electric Vehicle Symposium, Washington, D.C., Oct., 1986.
E. H. Lechner and S. E. Schladover, "The Roadway Powered Electric Vehicle—An All-electric Hybrid System," 8th International Electric Vehicle Symposium, Washington, D.C., Oct., 1986.
S. E. Schladover, "Systems Engineering of the Roadway Powered Electric Vehicle Technology," 9th International Electric Vehicle Symposium, Toronto, Ont. Canada, Nov., 1988.
M. H. Kheraluwala, D. W. Novotny, D. M. Divan, "Design Considerations for High Frequency Transformers," IEEE-PESC-90 Record, pp. 734–742.
HLN Weigemann, D. W. Novotny, D. M. Divan, R. Mohan, "A ZVS Dual Resonant Converter for Battery Charging Applications," Power Electronics Specialists Conference, 1991.
F. C. Schwarz, J. B. Klaassens, "Controllable 45-kW Current Source for DC Machines," IEEE Transactions on Industry Applications, vol. IA-15, No. 4, Jul./Aug., 1979, pp. 437–444.
D. M. Divan, G. Venkataramanan, R. DeDoncker, "Design Methodologies for Soft Switched Inverters," IEEE-IAS 1988 Conference Record, pp. 758–766.
J. M. Hillhouse, "EV's Downunder—Electric Vehicles in Mining," 10th International Electric Vehicle Symposium, Hong Kong, Dec., 19990.
A. Esser, H. C. Skudelny, "A New Approach to Power Supplies for Robots," IEEE Transactions on Industry Applications, vol. 27, No. 5, Sep./Oct., 1991, pp. 872–875.

Primary Examiner—Emanuel T. Voeltz
Attorney, Agent, or Firm—Klarquist, Sparkman, Campbell, Leigh & Whinston

[57] ABSTRACT

A contactless power transfer system, especially for powering electric loads, hazardous loads or underwater loads and the like. A converter supplies high frequency power to a conductor loop. A coupling sheath or link has a core-mounted conductor at least partially surrounded by a magnetic core which slidably receives a portion of the conductor loop within the link. An optional secondary converter converts power from the core-mounted conductor to meet the load requirements. A contactless power distribution system delivers power to a variety of loads through clamped-on or captive links attached at any location along the conductor loop. Methods are also provided of powering a movable electric load, or a stationary load from a movable source, and of distributing power to a plurality of portable electric loads.

86 Claims, 8 Drawing Sheets

FIG. 5
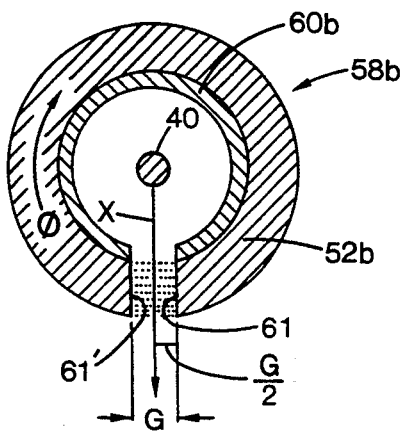
FIG. 6
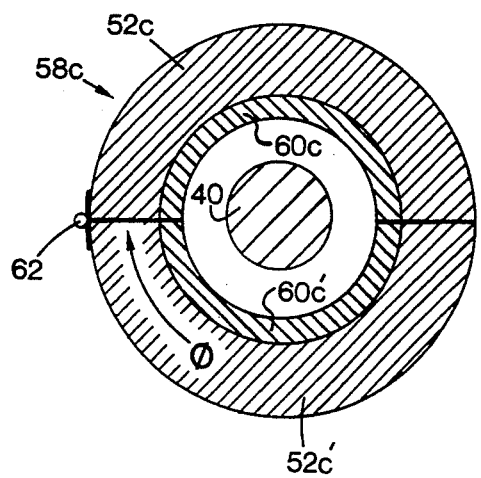
FIG. 7
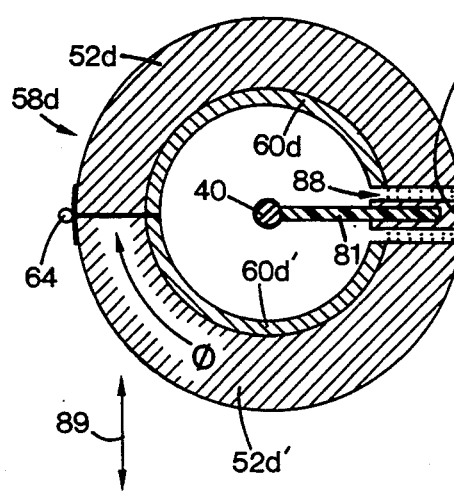
FIG. 8
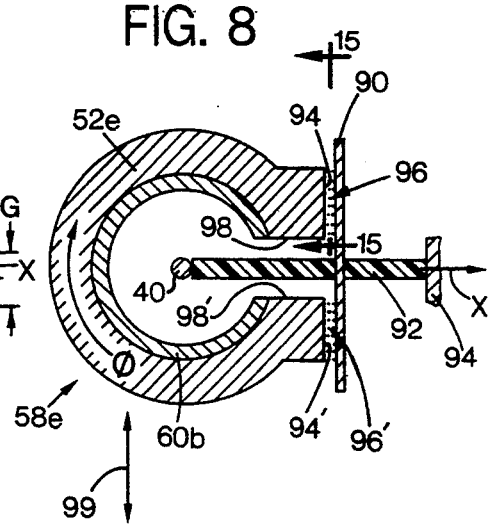
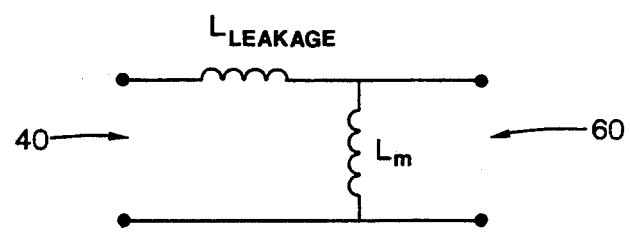
FIG. 9

1 = primary
2 = secondary
i = inner
o = outer
c = core
ins = insulation

CONTACTLESS COAXIAL WINDING TRANSFORMER POWER TRANSFER SYSTEM

BACKGROUND OF THE INVENTION

The present invention relates generally to systems for delivering power from an electrical source to an electric load, especially where there is relative motion between the source and the load, and more particularly to an improved contactless power delivery system, an improved contactless power distribution system, and methods for accomplishing this power transfer without contact of primary and secondary windings, such as may be used in electric vehicles, elevators, temporary work sites, underwater applications and the like. Also on Sep. 27, 1991, the same inventors filed U.S. patent application Ser. No. 07/766,756, which issued on Oct. 20, 1992, as U.S. Pat. No. 5,157,319, entitled "Contactless Battery Charging System." The '319 patent discloses a contactless recharging system and method for charging an energy storage device, such as one onboard an electric vehicle, using a coupling link, which may be constructed in one of the forms described further below.

The problem of supplying energy to electric vehicles while they are moving on a roadway has been considered difficult to solve. In the past, systems transferring large amounts of electrical power, such as up to one megawatt, to a moving load have traditionally used means that are unreliable, inefficient, and potentially unsafe, such as sliding or rolling metal contacts, sliding carbon brushes, and trailing cables. For example, pantograph sliding contacts have been used extensively for trolleys and urban transit systems traveling on rails. However, these railway traction systems are not a viable consideration for electric vehicles designed for consumer use because the public has access to the roadways and would be endangered by the exposed contacts. Additional problems include wear, corrosion, contact bounce and thermal cycling, all of which result in poor connection between the moving contacts. Furthermore, the reliability and maintenance problems of sliding mechanical contact systems significantly increase the initial capital costs of installation and the maintenance costs thereafter.

Recently, some of these problems have been mitigated using inductively coupled flat coils in combination with power electronics, which were ignored in the other earlier techniques. Several systems have been proposed for using magnetic induction to transfer power from a fixed source to a moving vehicle. For example, the following three articles propose various systems having a fixed primary winding buried in a roadway along which electric vehicles travel: K. Lashkari, S. E. Schladover, and E. H. Lechner, "Inductive Power Transfer to an Electric Vehicle," 8th International Electric Vehicle Symposium, Washington, D.C., October, 1986; E. H. Lechner and S. E. Schladover, "The Roadway Powered Electric Vehicle-An All-electric Hybrid System," 8th International Electric Vehicle Symposium, Washington, D.C., October, 1986; and S. E. Schladover, "Systems Engineering of the Roadway Powered Electric Vehicle Technology" 9th International Electric Vehicle Symposium, Toronto, Ont. Canada, November, 1988. However, these systems suffer a variety of drawbacks, including the need for embedded coils along the path of travel, mandatory fast and accurate air gap control, and the requirement of two large flux collection or conduction surfaces. Each of these drawbacks seriously impacts on the economic practicality of these systems.

As a specific example, the State of California is considering an electric vehicle highway proposal for contactless distribution of power to moving vehicles. In the California approach, cables are buried in the roadway and energized. The vehicle carries an induction coil which receives induced current for use in propulsion and battery recharging. The California system uses a positioning control on the vehicle to maintain the distance between the two flux collection surfaces of the buried cable and the coil to within 5 cm to provide sufficient power pickup.

The California system has several drawbacks. For example, the normal attractive forces between the vehicle and the buried cable can reach high levels during the required power transfer. The attractive forces also increase the frictional forces required to move the vehicle along the roadway. The controller must counter these attractive forces by positioning the vehicle-mounted collector above the roadway surface. Additionally, the magnetic coupling between the cable and coil in the California system is poor due to the large air gap, yielding poor efficiency, low power/weight density (i.e., kilowatts per kilogram), and poor utilization of core material. To compensate for the large air gap space between the vehicle-mounted secondary collector and the buried primary conductor a very large primary converter is required to power the buried conductor. To improve the magnetic coupling, the roadway cable must be buried with significant amounts of magnetic core material, which greatly increases the initial and operating costs of the California system.

Thus, a need exists for an improved manner of delivering power from a source to an electric load, especially where there is relative motion between the source and the load, such as may be used in industry, construction, mining, and electrical vehicle applications, which is directed toward overcoming, and not susceptible to, the above limitations and disadvantages.

SUMMARY OF THE INVENTION

In accordance with an illustrated embodiment of the present invention, a contactless power delivery system is provided for delivering power between first and second conductors to provide a flexible power delivery system for arcless coupling in hazardous and other environments, such as in underwater applications. This contactless power delivery system also delivers power when there is relative motion, i.e. linear and/or rotational, between first and second conductors. The first conductor at least partially surrounds a portion of the second conductor, and a magnetic core at least partially surrounds a portion of the first conductor so as to transfer power between the first and second conductors by magnetic induction. This power transfer occurs independent of the position and motion of the second conductor relative to the first conductor, and independent of relative motion between components of the magnetic core. Either the first or second conductor may serve as the primary winding and the other as the secondary winding. Methods are also provided of powering a movable electric load or a stationary load from a movable source, and of distributing power to a plurality of portable electric loads.

An overall object of the present invention is to provide an improved contactless manner of delivering power from a source to an electric load.

A further object of the present invention is to provide an improved contactless power delivery system for delivering power to movable electric loads.

Another object of the present invention is to provide an improved flexible power distribution system.

Yet another object of the present invention is to provide an improved method of delivering power to a movable electric load.

Still a further object of the present invention is to provide an improved method of distributing power, for example in a shop, mining, or construction environment.

An additional object of the present invention is to provide a safer, more reliable, efficient and economic system for transferring power between a source and an electrical load.

The present invention provides many significant advantages over the earlier systems, including the ability to deliver great quantities of electrical power across large air gaps during relative motion between the source and the load. Contactless power delivery is accomplished by magnetic induction across a radial interwinding space (described below). Furthermore, significant economic advantages may be obtained by using high operating frequencies with this contactless power transfer scheme. The contactless power delivery system is also insensitive to interwinding clearance between the primary and secondary conductors, leaving the system essentially unaffected by the position of the fixed conductor within the core window. Furthermore, this contactless power delivery is unhampered by linear and rotational motion of the coupling link when traveling along the length of the fixed conductor.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIG. 5 is a radial sectional view of one form of coupling link of the present invention having a core with a gap in the flux path;

FIG. 6 is a radial sectional view of one form of a split hinged coupling link of the present invention having a core a minimal air gap in the flux path during operation;

FIG. 7 is a radial sectional view of one form of a coupling link of the present invention having a split hinged core with a gap in the flux path and an enhanced core;

FIG. 8 is a radial sectional view of an alternate form of a coupling link of the present invention having a split core with a gap in the flux path and an enhanced core;

FIG. 9 is a schematic diagram of an equivalent circuit of a coupling link of the present invention surrounding a conductor;

DETAILED DESCRIPTION OF PREFERRED EMBODIMENTS

Figure 1:
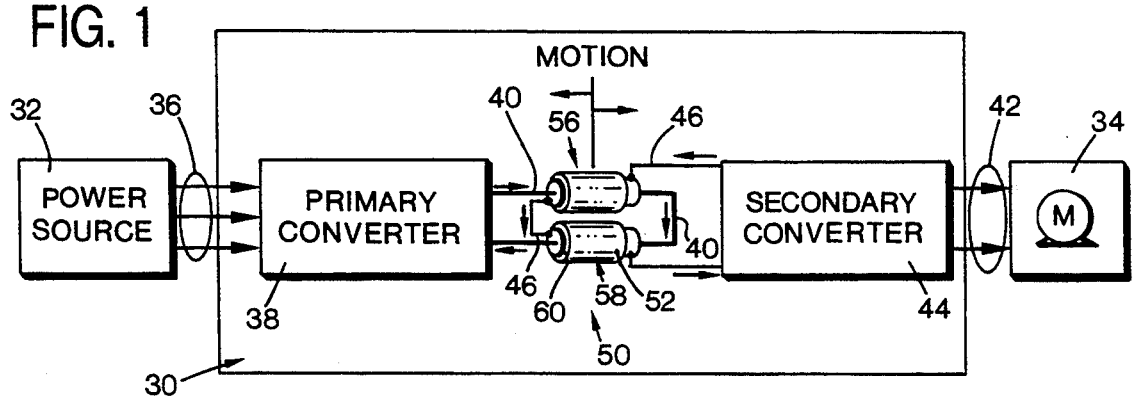
FIG. 1 is a schematic block diagram of one form of a contactless power delivery system of the present invention.

FIGS. 1–4 illustrate an embodiment of a contactless power delivery system 30 constructed in accordance with the present invention for delivering power from an electric source 32 to an electric load indicated generally as 34, with a specific embodiment of a movable electric load indicated as 34'. The source 32 may be an alternating current (AC) power or direct current (DC) power, or a combination of AC and DC power. Typically source 32 is a utility system providing AC power at a line frequency, for example, 60 Hz in the United States. The electrical load 34 may take on a variety of configurations including: autonomous electric vehicles, such as for consumer passenger car use; haulage, conveying, trolley and railway equipment, such as may be used in mining, industrial or urban mass transit applications; batteries requiring recharging, including when in motion; electrical vehicles requiring a power boost, such as when climbing a steep grade or hill; linearly moving loads in a captive path, such as in elevators, conveyors and the like; industrial applications, such as robotic arms having continuously rotating joints or requiring linear motion in synchronism with a conveyor line; portable electric loads where flexibility is a priority, such as progressive loads in mine face and construction site applications; temporary work sites where quick setup is a priority, such as in military applications; electrical loads located in hazardous environments where electrical arcing is hazardous; under-water loads or loads located in other non-magnetic liquids; and in space application with or without atmosphere. Several specific examples are discussed further below with reference to FIGS. 16–19, 21 and 24.

This list of examples for the electric load 34 is provided merely by way of illustration, and it is apparent that many other applications may find the contactless power delivery system 30 described herein to be of use. For example, while for convenience the illustrated embodiments initially discuss power transfer from a fixed primary to a moving secondary (see FIGS. 1–20), it is apparent that the primary and secondary may be reversed. Thus, power flow from a moving source 32′ to a stationary load 34 is also within the scope of the present invention (see FIGS. 24–25). It is also apparent that the relative motion of the primary and secondary illustrated herein may be due to linear and/or rotary motion of either component with respect to the other (see FIGS. 21–23). The actual values for the parameters discussed herein will of course vary by application, and the values shown here are given only by way of example.

Conductors 36 couple a primary side or primary converter 38 with the electrical source 32 which may be a three phase AC source, a single phase or other polyphase sources or a DC source. The system described herein may operate totally at the line frequency of the AC source 32. However, it is preferred to gain additional operating efficiencies, desirable performance attributes, and marketable useful configurations by using the primary converter 38 to increase the frequency of operation, for instance on the order of 400 to 5,000 Hz, depending upon the most cost effective type of converter, and the inductance of the circuit as seen by the primary converter. As a practical example, to construct economic devices, there are tradeoffs between the device cost, switching frequencies, and loss considerations due to heating and the like. The frequency of operation generally decreases as the power rating increases, based upon these economic concerns. A specific embodiment of a primary converter 38 is discussed in greater detail below (see FIG. 13). The high frequency AC output of the primary converter 38 is supplied to a primary conductor or primary loop 40.

In the illustrated embodiment of FIGS. 1–20, conductors 42 deliver power from an optional secondary side or, simply, secondary converter 44 to the load 34. The secondary converter 44 receives power through a secondary conductor or secondary loop 46 in a manner described in further detail below. Various types of secondary converter designs may be used, ranging from simple to complex as required by the particular application. In some applications, the secondary converter 44 may be used to condition the power to the load 34 in terms of voltage or current regulation, phase change, voltage boost or frequency control, such as to provide power to load 34 at a desired AC frequency, or as direct current (DC) power. The secondary converter 44 may also provide inner loop control, such as by processing feedback from the load, as opposed to outer loop control involving feedback to the primary converter 38. An illustrated embodiment for the optional secondary converter 44 is discussed further below (see FIG. 14).

Power is delivered from the primary conductor 40 to the secondary conductor 46 by slidable coupling means, such as a link or coupling sheath 50. The link 50 has a magnetic core 52 of a substantially toroidal or tubular shape, including rectangular and any other polygonal cross-section. The core 52 may be of a ferromagnetic material, such as a conventional silicon steel or an amorphous steel. The core 52 may be segmented and hinged or have flux path air gaps as described further below. The primary loop 40 is slidably received within link 50.

In the illustrated embodiments of FIGS. 1–4, the link 50 is a dual link including two identical link members 56 and 58. The primary loop 40 has power flow sending and return portions 40′ and 40″, respectively. The first link member 56 is slidably received on the sending conductor 40′, and the second link member 58 is slidably received on the return portion 40″. Other embodiments described further below illustrate a single link member, such as 58, coupled with primary conductor. The selection of a single member or dual members for the link 50 depends upon the particular application in which the contactless system 30 is used, as well as various optimization techniques employed to provide the most efficient and economical unit for a given application.

The secondary conductor 46 includes a core-mounted secondary winding 60 which may be a tubular copper member 60, substantially surrounded by core 52. Alternatively, it is apparent that the secondary winding 60 may also be comprised of a plurality of discrete elements evenly distributed about the inner surface of the core to provide a uniform distribution of current. The secondary winding 60 may be a split or segmented into at least two tubular members separable from one another and configured to join one another in a longitudinal direction. Alternatively, the secondary winding 60 may be C-shaped or U-shaped in radial cross section.

The secondary winding 60 and core 52 are defined as being substantially concentric about a longitudinal axis Y. For example, referring to FIG. 2, the link member 56 has a longitudinal axis $Y_1$, and link member 58 has a longitudinal axis $Y_2$. In the illustrated ideal situation, the conductor 40 is located concentrically within the secondary winding 60 and the core 52, and therefore has a longitudinal axis colinear with the longitudinal axis of the link members 56, 58. The term contactless as used herein means without any electrical contact between the two primary and secondary windings, other than magnetic coupling between the windings.

Figure 3:
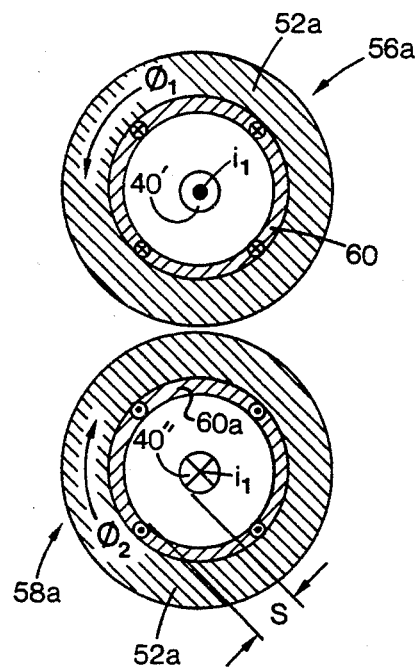
FIG. 3 is a side elevational view taken along lines 3—3 of FIG. 2.
Figure 4:
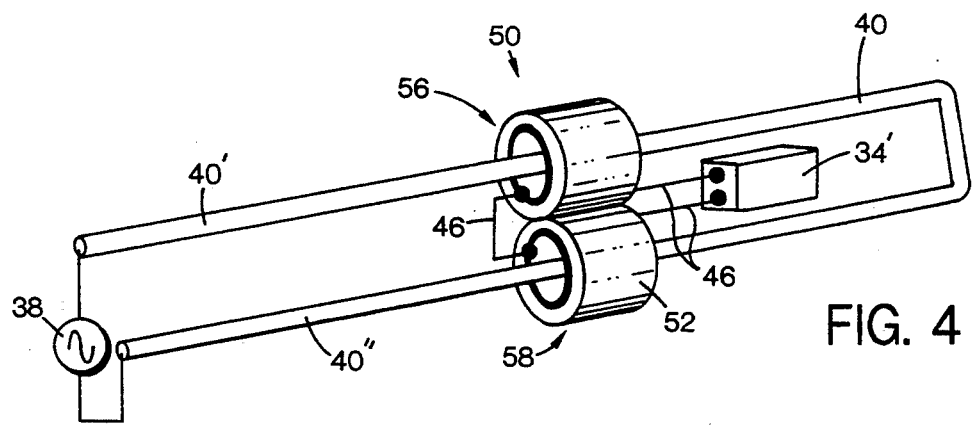
FIG. 4 is a combined schematic and perspective view of one form of a dual link of the present invention having a movable secondary load.

In FIG. 3, the current flow of the primary and secondary current is illustrated schematically. The current through conductor segment 40′ moves out of the paper as indicated by the dot (arrowhead) therein, and the current through conductor 40″ passes into the paper as indicated by the X (arrow tail) therein. Similar conventions are used at four locations about the periphery of the secondary conductor 60 to schematically indicate the direction of current flow therethrough.

In discussing the one possible theory of operation for the illustrated embodiment, the assumption is that the power flows from the fixed primary conductor 40 to the movable secondary conductor 60 of link 50. It is also equally possible to have power generated by the movable load and transferred from the outer winding 60 to the inner winding 40 (see FIG. 25), or to have the secondary conductor moving and the link 50 fixed (see FIG. 21). As used herein, the term "fixed" refers to being secured in a relatively singular location, although it is apparent that the fixed member may flex or move somewhat as required or directed during operation.

Figure 18:
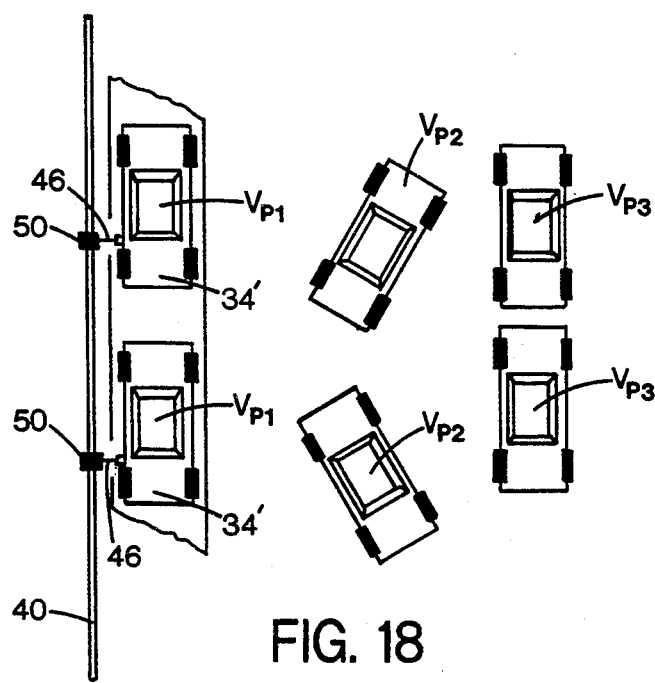
FIG. 18 is a top plan view of one form of an electric vehicle recharging or boosting system of the present invention.
Figure 19:
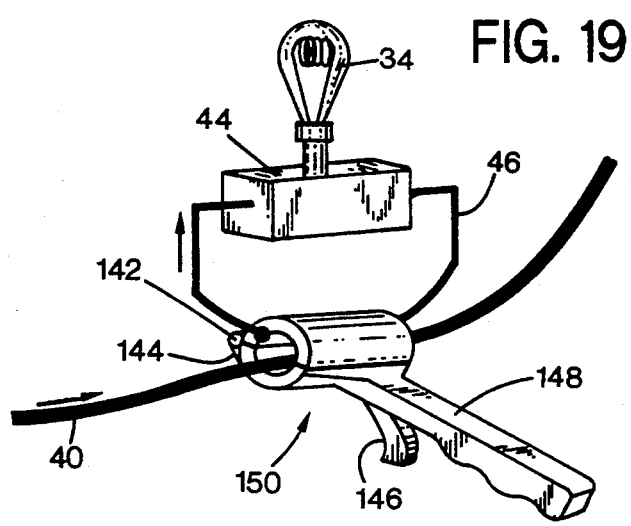
FIG. 19 is a perspective view of a portion of one form of a flexible power distribution system of the present invention.

To illustrate the concepts of the present invention, the contactless power delivery system 30 is described herein for two basic embodiments, one for a mobile electric load 34' (see FIGS. 16–18), and the other for a clamp-on link 150 used for power distribution (see FIG. 19). For example, the link 50 moves with the moving load 34' and requires a radial clearance, referred to herein as an "interwinding space" S shown in FIG. 3.

The interwinding space S is distinct from an air gap G in the flux path of core 52, as shown in FIG. 5. The term "air gap" as used herein refers not only to air, but to any non-magnetic liquid or gaseous medium flowing through the gap G, and comprising the environment in which link 50 travels or is located.

Thus, the link 50 with primary conductor 40 inserted therein provides a generally coaxial arrangement. This coaxial nature yields low leakage inductance which enables the use of high frequencies in the contactless system 30, and results in high power densities. The distributed current of the secondary winding 60 surrounds the current of the inner primary conductor 40, and has been given the name "coaxial winding transformer" or "CWT" by the inventors of the present invention. Furthermore, coaxial winding transformer theory may be used to analyze link 50 with loop 40 passing therethrough, and for convenience this arrangement is sometimes referred to herein as a CWT. The various transformer concepts presented herein may be similar in some aspects to conventional current transformer theory for instrument, relaying, and radio frequency power supply applications, except that the core used herein is not restricted to operation in the linear region. Further, for power transfer at high frequencies, it is desirable to have a low transformer leakage inductance.

The power density of core 52 is directly proportional to the frequency of the power passing through the windings 40, 60. Therefore, the use of high frequency power passing through link 50 advantageously increases the operating efficiency of the contactless system 30. Also, the use of high frequency currents in system 30 advantageously allows the use of small-size components to provide the required power transfer. These concepts are feasible to implement in a practical sense, and may be constructed at a potentially low cost.

Several of the cores and link members shown herein for the purposes of illustration are cylindrical members having basically circular or square cross sections. However, it is apparent that other cross sectional shapes may be used to at least partially surround conductor 40, in toroidal or cylindrical configurations, such as rectangular, elliptical or semi-circular cross sections. Several basic CWT core configurations are shown, with one being a toroidal, gapless core, as shown in FIGS. 1–4 and 6. Another basic CWT core configuration has a C-shaped core with an air gap G in the circumferential magnetic flux path of the core (see FIGS. 5, 7 and 8). Several rectangular configurations having separable cores are shown in FIGS. 22–24 and 27.

Referring to FIG. 5, an alternate link member 58$b$ has a C-shaped core member 52$b$ with an air gap G. In contrast, the gapless core 52$a$ of FIG. 3 is captive, and not easily detached from the primary cable 40. Thus, the C-shaped core 52$b$ is advantageous in that it can be easily removed by passing the primary cable 40 through the air gap. The flux path $\phi$ of FIG. 5 includes the air gap G with the flux traveling across gap G between surfaces 61 and 61' of core 52$b$. It is apparent that the air gap may travel any radial path or a path skewed to the radius, i.e., a chordal path or a spiral path linking the core inner and outer surfaces.

The portable clamp-on link (see FIG. 19) typically does not move continuously along the primary cable, although some lateral motion may be accommodated. Rather, the interwinding space S of the clamp-on link is only required for insulation and protection during rugged use and is preferred to be less for a moving link. A cross sectional view of a suitable clamp-on link member 58$c$ is shown in FIG. 6 as having two separable, mating core portions or segments 52$c$ and 52$c'$ joined together, for instance by a hinge 62. The separable core segments may be joined by a technique used in clamp-on ammeters, which may use a Hall effect of the magnetic material surrounding a conductor to monitor the current flowing therethrough. A variety of other means may be used to secure the two core segments together, including mechanical fasteners, and the magnetic forces of attraction between the core segments when flux is flowing in the same direction through each core segment. The secondary conductor of link member 58$c$ is also separable and split into two components, 60$c$ and 60$c'$ surrounded by the core halves 52$c$ and 52$c'$, respectively. This composite design incorporates the feature of being removable in a substantially radial direction with the feature of a gapless core, that is "gapless" to the extent there is a minimal air gap between the core segments when the link is closed.

FIG. 7 illustrates an alternate embodiment of a separable C-shaped link member 58$d$ illustrated as having two core members 52$d$ and 52$d'$ joined together, such as by a hinge 64, which may be the same as hinge 62. The secondary winding of link member 58$d$ is also split into two sections 60$d$ and 60$d'$. The C-shaped core of FIG. 7 has an air gap G which receives a primary conductor support 80 which may be a plurality of discrete members (not shown). However, the illustrated support 80 is a longitudinal composite member having two insulative members 81 and 82 joined together by a flux conduction enhancing member, such as an I-beam shaped member 83 of a magnetic material. The magnetic member 83 is supported within the air gap by insulative member 81 which extends outwardly from a fixed surface 84 adjacent to the electric load 34'.

The flux path $\phi$ of FIG. 7 has an enhanced air gap compared to that shown in FIG. 5. The magnetic reluctance of the air gap is decreased by providing the magnetic member 83 across the air gap. The air gap magnetic reluctance is also reduced by providing a pair of enhanced surface area members 86 and 86' at the core adjacent the air gap, defining a flux path 88 therebetween, as shown in FIG. 7. The flux path 88 of core 52d, 52d' is separated by the magnetic member 83 of the composite support 80 into two components and thus would include the magnetic permeability of the member 83.

If the support 80 is one of a series of discrete supports (not shown), typically between such discrete supports the flux path 88 is comprised only of air, assuming that air is the medium in which the system is operating. The total air gap G remains the same regardless of bouncing fluctuations of the link member 58d in directions indicated by arrow 89, which is substantially perpendicular to the radial axis X. In the embodiment of FIG. 7, the air gap G may be kept to a minimum, which advantageously reduces the total weight of the core segments 52d and 52d', and which advantageously minimizes material costs to construct the link member 58d.

Referring to FIG. 8, a link member 58e has a C-shaped core 52e which may be used with an auxiliary fixed core member 90. The fixed core member 90 may be a long planar member of a magnetic material extending along the predetermined path of travel of the electric load 34'. The fixed magnetic member 90 may be suspended from an insulating support member 92 extending outwardly from a fixed surface 94 to support primary conductor 40. The core 52e includes an enhanced air gap core face having segments 94 and 94' which provide flux paths 96, 96' between the core 52e and fixed magnetic core member 90. The link member 58e of FIG. 8 allows for a larger gap between faces 98 and 98' of core 52e, to allow for greater freedom of movement in the direction indicated by arrow 99, which is substantially perpendicular to the radial axis X. Thus, greater amounts of bounce may be accommodated in the direction indicated by arrow 99, particularly if the flux paths 94, 94' remain relatively constant between the moving core 52e and the fixed core member 90.

A. Coupling Link Theory of Operation

For simplicity, the analysis of the action of link 50 with respect to primary conductor 40 will be described for the gapless core of FIGS. 1-4. The design parameters for the illustrated gapless core and the movable electric load 34' are shown in Table 1.

TABLE 1

| Design Constants for Example | |
|---|---|
| f = 2000 Hz | |
| $f_r$ = 2500 Hz | |
| $B_m$ = 1.4 T | |
| $N_1$ = 1 | |
| $N_2$ = 1 | |
| $\rho_{wgt-core}$ = 7.32 gm/cm$^3$ (amorphous metallic glass) | |
| $\rho_{wgt-cu}$ = 8.92 gm/cm$^3$ | |
| $\rho_{cu}$ = 0.205 × 10$^{-5}$ Ω-cm | |
| $\rho_{core-loss}$ = 0.226 watts/cm$^3$ | |
| $t_{insul}$ = 1 mm | |
| $\mu_r$ = 10$^5$ (amorphous metallic glass) | |
| stacking factor = 0.75 | |
| Loads: | |
| Rating: | 100 kW each, 10 units |
| Duty cycle: | 100% |
| Frequency: | 0 (dc) |
| Voltage: | 600 |
| Path Length: | 1 km, in 5 segments |
| High Frequency Source: | |
| Rating: | 1 MW total |
| Frequency: | 2000 Hz |
| Cable Current Density: | 200 amp/cm$^2$ |
| Secondary Current Density: | 400 amp/cm$^2$ |

(1) Equivalent Circuit and Leakages Inductance

As shown in FIG. 9, the CWT equivalent circuit diagram for link 50 and primary conductor 40 is asymmetric. The equivalent circuit is oriented with the primary conductor 40 to the left, and the secondary winding 60 to the right. The leakage inductance is indicated as $L_{LEAKAGE}$, and the magnetizing inductance is indicated as $L_m$. This asymmetry is known from current-transformer theory and is due to the essentially 100% linkage of the primary current by the magnetic flux of the secondary winding 60. Any meaningful inductance on the secondary side is due to the external circuit, that is, any inductance in the secondary loop 46, the secondary converter 44, or conductors 42 therebetween.

Figure 10:
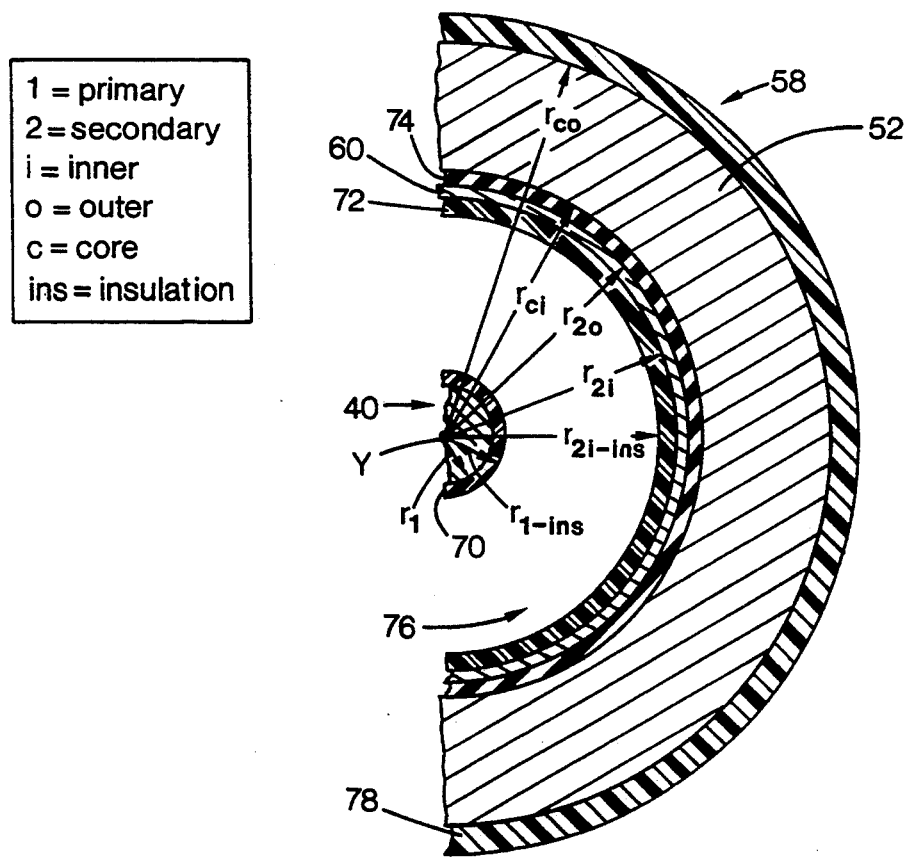
FIG. 10 is a partial radial sectional view illustrating the radial dimensions of one form of a coupling link surrounding a conductor, each of the present invention.

In FIG. 10, the link member 58 is illustrated in greater detail. The center-most conductor 40 may be an insulated conductor surrounded by an insulation layer 70. The secondary winding 60 has inner and outer insulation layers 72 and 74, respectively. The primary insulation layer 70 and the secondary winding inner insulation layer 72 define therebetween an interwinding region indicated generally at 76. The secondary winding outer insulating layer 74 separates the secondary conductor 60 from the magnetic core 52. The core 52 may be surrounded by an insulative layer 78 which is preferably of a durable plastic, or resilient rubber or other material which could be surrounded by an additional durable housing (not shown) if required to provide a rugged link 50 capable of withstanding physical abuses encountered during normal use. Preferably, the insulative layers 70 and 72 are also of a durable material, since they may be subjected to occasional frictional forces from rubbing against one another during use. Also, the center-most conductor 40 may be subjected to environmental abuses.

FIG. 10 also illustrates several radii extending from the longitudinal axis Y. The various radii have the subscripts, with the numeral 1 indicating the primary conductor 40, the numeral 2 indicating the secondary winding 60, the letter "i" indicating inner, and the letter "o" indicating outer, the letter "c" indicating the core 52, and the letters "ins" indicating the insulation layers.

The CWT has an unusually low leakage inductance which allows for a high current capacity and the use of high frequency switching converters 38 and 44 in the contactless power delivery system 30. The leakage inductance per axial meter of core length (parallel with longitudinal axis Y) may be determined in a fashion similar to that for a coaxial transmission line. For instance, when the outer conductor can be approximated by an infinitely thin current sheet:

$$L_{LEAKAGE} = [(N_1^2 \mu_0) \div (8\pi)][1 + 4ln(K)]H/m \quad (1)$$

$$K = (r_{2i} \div r_1) \geq 1 \quad (2)$$

where:
$N_1$ = primary turns
$r_{2i}$ = distributed secondary current sheet radius
$r_1$ = the primary cable outer radius
$\mu_0$ = permeability of free space ($4\pi \times 10^{-7}$ H/m)

Figure 11:
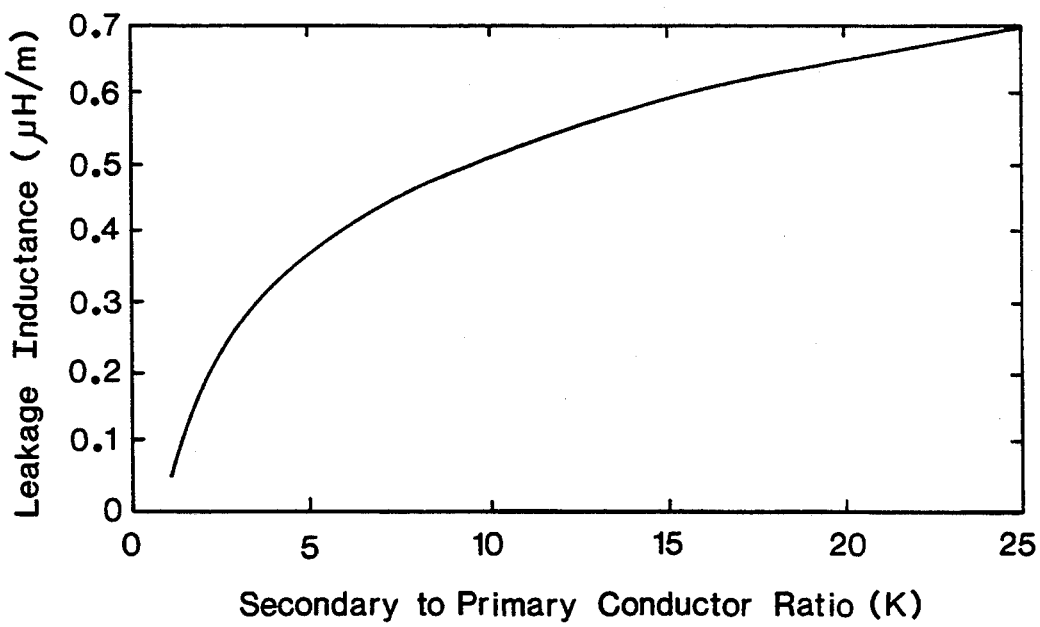
FIG. 11 is a graph of leakage inductance as a function of interwinding space for an illustrated embodiment.

The leakage inductance per axial meter for a range of values for the secondary to primary conductor ratio K is shown in the graph of FIG. 11. In a more generalized embodiment, K is the ratio of the effective radius of the core-mounted current sheet to the outer radius of the inner-most conductor. The ratio K differs from the interwinding space S as shown in FIG. 10. The ratio K relates to conductor dimensions, whereas S accounts for insulation in determining available space within the interwinding region 76. The FIG. 11 graph shows that the leakage inductance $L_{LEAKAGE}$ increases slowly with the value of K, and is less than one microhenry per meter for K≦25. Thus, the interwinding space S and interwinding region 76 for relative motion between conductor 40 and the interior of link 50 is readily provided.

Furthermore, the leakage inductance $L_{LEAKAGE}$ is insensitive to the position of primary conductor 40 with respect to the longitudinal axis Y of link member 58. This characteristic advantageously results in less stringent requirements for a position controller between, for instance, a moving vehicle supporting the link 50 and the primary conductor 40 (see FIGS. 16–18). Thus, any relative movement, linear or rotational, between the primary and secondary windings 40, 60 has a negligible effect on the leakage inductance $L_{LEAKAGE}$ and the flux stays substantially constant.

(2) Magnetizing Inductance

The $L_m$ magnetizing inductance for a given core length $l_c$, assuming there are no air gaps G in the circumferential flux path of the core 52a, is:

$$L_m = [\mu N_1^2 (r_{co} - r_{ci}) l_c] \div [\pi (r_{co} + r_{ci})] \quad (3)$$

where:
$\mu$ = core permeability
$r_{co}$ = core outer radius
$r_{ci}$ = core inner radius
$l_c$ = axial core length As with all power delivery transformers, it is desirable to have the magnetizing inductance $L_m$ be as large as possible to minimize the magnetization current required. Thus, it is apparent that based upon the magnetizing inductance only, it would be desirable to have the core length $l_c$ be large, resulting in a long, thin core.

(3) Power Density

Figure 2:
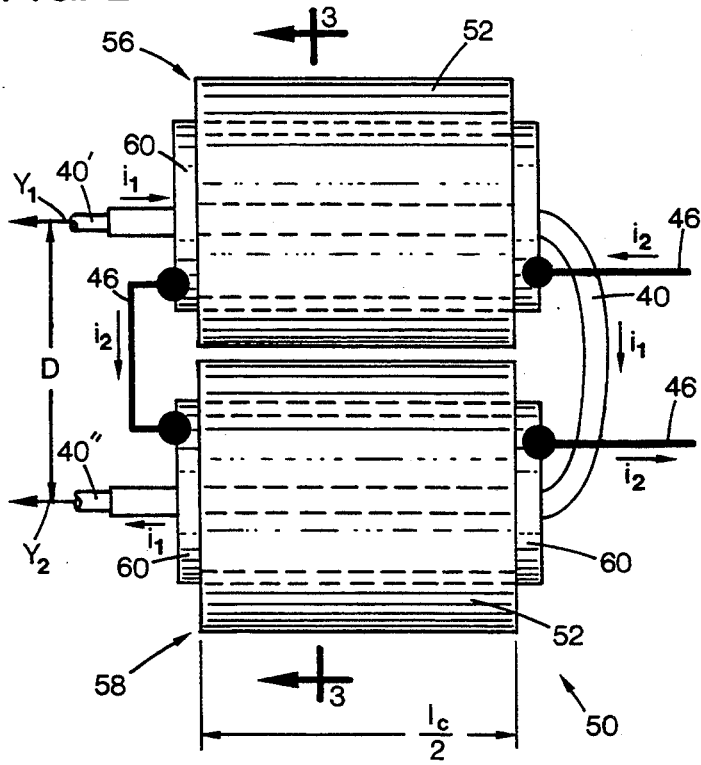
FIG. 2 is a front elevational view of one form of a dual coupling sheath or link of the present invention coupled with a conductor.

The power density per unit weight $P_{wgt}$ may be determined by expressing both power and weight in terms of the given parameters then determining the ratio therebetween. For sinusoidal root-mean-square values, unity power factor, and negligible magnetizing current $L_m$ and negligible losses, it can be shown that the power density is:

$$P_{wgt} = [2\pi f B_m N_1 i_1 (r_{co} - r_{ci})] \div [\pi (r_{co}^2 - r_{ci}^2) \rho_{wgt\text{-}core} + (N_2 i_2 \rho_{wgt\text{-}cu})/2] \quad (4)$$

where:
f = frequency (Hz)
$B_m$ = peak flux density (T)
$\rho_{wgt\text{-}core}$ = core density (kg/m³)
$\rho_{wgt\text{-}cu}$ = copper density (kg/m³)
$J_2$ = secondary circuit current density The power density $P_{wgt}$ is independent of the core axial length $l_c$, since the transformer voltage, and hence the transformer power, and volume both increase linearly with the core length. However, for a specified power rating, it is apparent that the core length $l_c$ may be optimized to provide a maximum power density. This analysis results in an extremely long, thin core 52 when the primary to secondary current ratio ($i_1:i_2$) is near unity. Up to this optimum, the longest acceptable core, with a minimum core radius $r_{ci}$ may be used to achieve maximum power density, since the power density is primarily dominated by core weight. An additional operating feature that may be provided is the use of two link members 56 and 58 as shown in FIG. 2, each having a core length contributing to the total core length $l_c$, here illustrated as one half of the total core length of $l_c$ or $l_c/2$. Thus, for the design example given above, the length of the link members 56 and 58 may be on the order of 30 cm.

(4) Coupling Sheath Dimensions and Characteristic Values

The radial dimensions shown in FIG. 10 may be calculated by beginning with the innermost dimension, that is radius $r_1$ of the primary conductor 40, and then progressing in an outward direction. The equation for power density given above shows that the power density is inversely proportional to the average core radius when the core weight term is much larger than the copper weight term of the denominator. The average core radius is related to the primary and secondary ampere-turns, as well as the interwinding space S, since the core 52 surrounds both windings 40, 60, and necessarily also encloses the interwinding region 76. The optimization tradeoff for having a large interwinding space value K is that the volume of core material, and hence weight, increases with the square of the average radius of the core $r_{c(avg)}$, and the power density $P_{wgt}$ decreases.

Thus, the desired interwinding space S varies with the particular application for the contactless power delivery system 30. For continuously moving loads 34' (see FIGS. 16–18) sufficient interwinding space S may be provided so the link 50 may be positioned along the primary conductor 40 without contact. However, in practicality, some contact may occasionally occur between the primary conductor 40 and link 50. Therefore, it may be desirable to have the primary conductor insulation 70 and the secondary winding inner insulation 72 be of a low friction insulating material, such as of TEFLON®. For a substantially stationary clamp-on link (see FIG. 19), the interwinding space S must only accommodate the insulation layers 70 and 72, without the requirement for a large interwinding region 76 as illustrated in FIG. 10. In practicality, it may be desirable to provide for a certain interwinding region 76 in the clamp-on embodiment, to accommodate multiple gauges of primary conductors 40. For the mobile unit 34', an interwinding space value K=5 is realistic, whereas for a clamp-on unit, a realistic interwinding space value is K=1.22, using realistic material constants as shown in Table 1 above and for a link 50 rated at 100 kW shown in Table 2 below.

TABLE 2

| Coaxial Winding Transformer Data | |
| --- | --- |
| kW: | 100 each (10 units) |
| phase: | 1 |
| Frequency: | 2000 |
| Primary and Secondary Voltage: | 200 |
| Primary and Secondary Current: | 500 |

B. Primary Conductor

Figure 12:
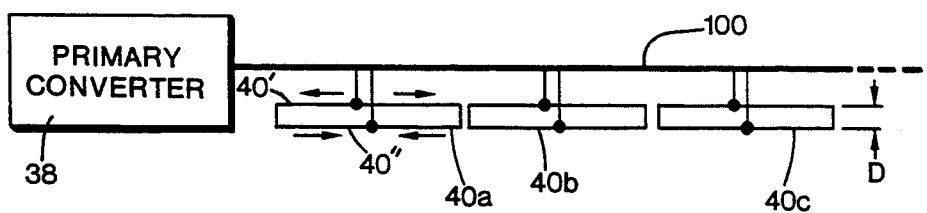
FIG. 12 is a schematic block diagram of one form of a segmented conductor portion of a power delivery system of the present invention.

The primary conductor 40 passing through each link member 56, 58 is assumed to be a single turn loop, with three such series connected loops 40a, 40b and 40c being shown in FIG. 12 for a system 30 having mobile loads 34'. Each of the series primary loops 40a, 40b and 40c receive power from conductor 100, which may be a low inductance coaxial power cable, coupled with the primary side converter 38. Using the split cores, such as of FIGS. 5, 7 or 8, or periodically opening the hinged unit of FIG. 6, a movable electric load 34' may move along a predetermined path from left to right in FIG. 12, and first receive power from primary loop 40a, then from loop 40b and finally from loop 40c and so on.

The effect of the primary cable 40 passing through the interwinding space 76 of link 50, as viewed from the high frequency source input of primary converter 38, is that there is virtually no affect experienced due to:

1. Primary cable position relative to the longitudinal axis Y of the link;
2. The position of link 50 along the primary conductor 40; and
3. The interwinding space S clearance between the primary conductor 40 and the interior of the link member.

Minimization of stray magnetic fields may require close spacing between the sending and receiving portions 40' and 40" of for example loop 40a. This feature of locating the sending and return paths 40 and 40' in relative close proximity makes the dual link 50 having link members 56 and 58 (see FIGS. 1-4) an attractive embodiment for reducing overall core lengths. A dual link may also be a more rugged and durable link 50.

The inductance of each primary cable loop 40a, 40b and 40c, is considered to be in series with the leakage inductances $L_{LEAKAGE}$ of link 50, and is given as:

$$L_{loop} = [(\mu_0 \div 2\pi)] [ln(D \div r_1)] \text{ per meter} \quad (5)$$

where D is the center-to-center lateral spacing of the sending and return path cables 40' and 40".

This equation shows the insensitivity to the inductance of the link 50 to the size or gauge of conductor 40 and to the spacing D between the sending and return loop portions 40' and 40". This equation also shows the linear dependence of the inductance of each loop $L_{loop}$ on length. The loop spacing D may be fixed by the dimensions of the cores of link members 56 and 58, with ($2r_{co}$) being the minimum possible for a centered primary cable axis (not shown) extending between the link members 56 and 58.

The loop segment input impedance $Z_{in}$ for each loop 40a, 40b and 40c is given by:

$$Z_{in} = (R_{pri} + R_{load(equiv)}) + j2\pi f(L_{loop} + L_1) \quad (6)$$

where each load unit $R_{load(equiv)}$ is the equivalent resistance at rated output referred to the primary side of the CWT.

When the reactive term on the right of the input impedance equation is much larger than the resistive term to the left, the loop input impedance $Z_{in}$ varies linearly with the loop length and frequency, but only logarithmically with the spacing. This characteristic of the loop input impedance suggests segmenting the primary conductor 40 into several small loops, such as 40a, 40b and 40c of FIG. 12, to reduce the loop length and required input voltage. In the design example of Tables 1 and 2 the loop input voltage for one large segment is over 7 kV, whereas the loop input voltage for 5 segments is only 4.1 kV.

In the illustrated embodiment, the resistance of the primary cable 40 dominates the power loss of the entire contactless power delivery system 30, as is the case in other power distribution and power transmission systems. For a given current density $J_1$, primary current $i_1$ and total length per segment $l_{loop}$, the resistance and power loss are given as:

$$R_{pri} = ([\rho_{cu} J_1] \div [i_1])(L_{loop}) \quad (7)$$

$$P_{loss} = \rho_{cu} J_1 i_1 l_{loop} \quad (8)$$

The design example calculations discussed herein are based on five 200 meter loop segments, three of which are shown as 40a, 40b, and 40c, with a total of 400 meters of primary cable length in each loop. The sample calculations also assume a dual link 50 having two link members 56 and 58 as shown in FIGS. 1-4. The parameters for the primary loop are given in Table 3 below, assuming each of the five loop segments has two 100 kW loads traveling thereon, which appear in series.

TABLE 3

| Primary Loop Segment Data | | |
|---|---|---|
| Parameter | Mobile | Clamp-on |
| D (cm) | 12.998 | 6.512 |
| $L_{loop}$ (mH) | 0.22 | 0.16 |
| $R_{rpi}$ (ohm) | 0.033 | 0.033 |
| $P_{loss}$ (kW) | 8.2 | 8.2 |
| $R_{load(equiv.)}$ (ohm) | 0.4/load unit | 0.4/load unit |
| $Z_{in}$ (ohm) | 0.833 + j2.76 | 0.833 + j2.07 |
| $V_{in}$ (rms volts) | 1441 | 1117 |
| $I_{loop}$ (rms, amperes) | 500 | 500 |
| $P_{in-max}$ (kW) | 200 | 200 |

C. Primary Side Power Electronics

Figure 13:
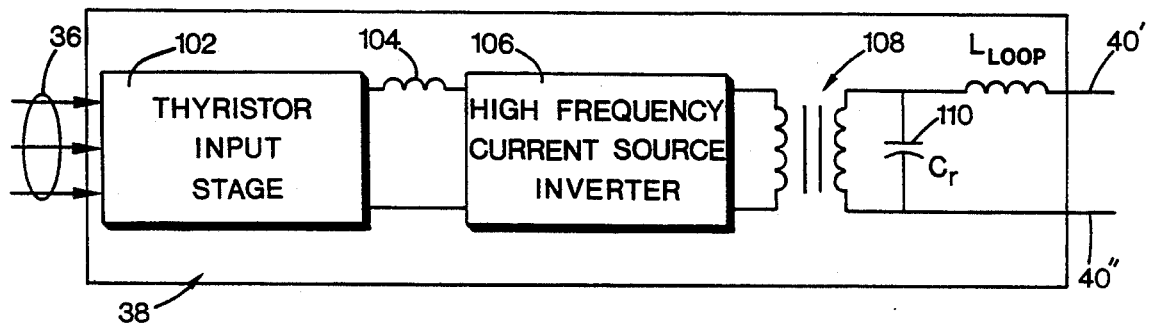
FIG. 13 is a schematic block diagram of one form of a primary side converter of the present invention.

The approach described herein uses power electronics to optimize system performance and to meet currently realized practical design considerations. In the illustrated embodiment, starting from an AC or DC source, here illustrated as a conventional three-phase 60 Hz AC source 32, a high frequency current on the order of 2 kHz is needed for the primary loop 40. At power levels of commercial interest, such as greater than one megawatt (1 MW), one cost effective approach involves using an input stage, such as a thyristor rectifier 102 as shown in FIG. 13. The rectifier 102 provides a DC output received by a choke coil 104 to provide a DC current source for a high frequency current source inverter (CSI) 106. The current source inverter 106 has a plurality of switches which are controlled to provide a desired high frequency output to an optional impedance matching transformer 108. If utility side power factor and harmonic interactions are a concern, harmonic filters (not shown) may be used for reactive and harmonic compensation, as is an industry wide standard practice. Alternatively, more advanced GTO-based (gate turnoff thyristor) force commutated input rectifiers, also known in the industry, may be used.

In the illustrated embodiment, two considerations are used to govern the choice of converter topology for the high frequency current source inverter 106 to provide the desired high frequency operation.

First, at the high operating frequency, the impedance of the primary conductor 40 is dominantly inductive. As seen in Table 3 above, the inductive impedance for a 200 meter segment of primary cable is 2-3 ohms, as opposed to a resistive component of 0.033 ohms, which clearly indicates that the primary conductor is highly reactive. Consequently, operating the contactless power delivery system 30 at 500 amperes, which corresponds to 200 kW, suggests the inductive component required to energize the cable is 700 kVAR. For the entire illustrated system, with a one megawatt rating (1 MW), this corresponds to an inverter rating of 3.5 MVA.

Overrating of the inverter may be avoided using a resonant inverter topology as is known in the art, for example, as described in an article by F. C. Schwarz and J. B. Klaassens entitled "Controllable 45 kW Current Source for DC Machines," IEEE Transactions IA, Vol. IA-15, No. 4, July/August, 1979, pp. 437-444. The inductance of the primary conductor 40 may be compensated using a parallel resonant capacitor 110 having a capacitance C=connected across the output of inverter 106. The volt ampere reactive (VAR) requirements of the primary cable 40 may then be supplied by the resonant capacitor 110, and the inverter 106 then need only supply the real power (watts) needed by the system. A preferred topology for the inverter 106 is a current fed series output parallel resonant (SOPR) inverter, such as that extensively used in induction heating applications at similar frequencies.

The second concern governing the choice of converter topology is that inverters switching at high frequencies are normally limited by the switching losses occurred within the devices. The use of resonant topologies allows device switching near zero voltage or zero current crossing points, which results in significantly lower switching losses and the ability to obtain higher frequencies.

The primary side converter output requirements for the illustrated example are listed in Table 4 below.

TABLE 4

| Primary Side Converter Data | | |
| --- | --- | --- |
| Parameter | Mobile | Clamp-on |
| MW | 1.0 | 1.0 |
| voltage (v) | 1441 | 1117 |
| current (a) | 694 | 95 |
| frequency (Hz) | 2000 | 2000 |
| phase | 1 | 1 |
| K | 5 | 1.22 |

The required capacitance $C_r$ for the resonant capacitor 110 to provide operation at a resonant frequency $f_r$ is:

$$C_r = (4\pi^2 f_r^2 n_1 L_{loop})^{-1} \qquad (9)$$

where $n_1$ is the number of loop segments, e.g., five in the illustrated embodiment, when the inductances of link 50 are relatively small and negligible when compared to the inductance of primary loop 40. Thus, in the illustrated design example, values for the resonant capacitor 110 are given in Table 5 below.

TABLE 5

| Resonant Capacitor Data | | |
| --- | --- | --- |
| Parameter | Mobile | Clamp-on |
| $C_r$ (μF) | 3.7 | 25.3 |
| Voltage (Vac) | 1441 | 1117 |
| Current | 500 | 500 |

D. Secondary Side Power Electronics

Figure 14:
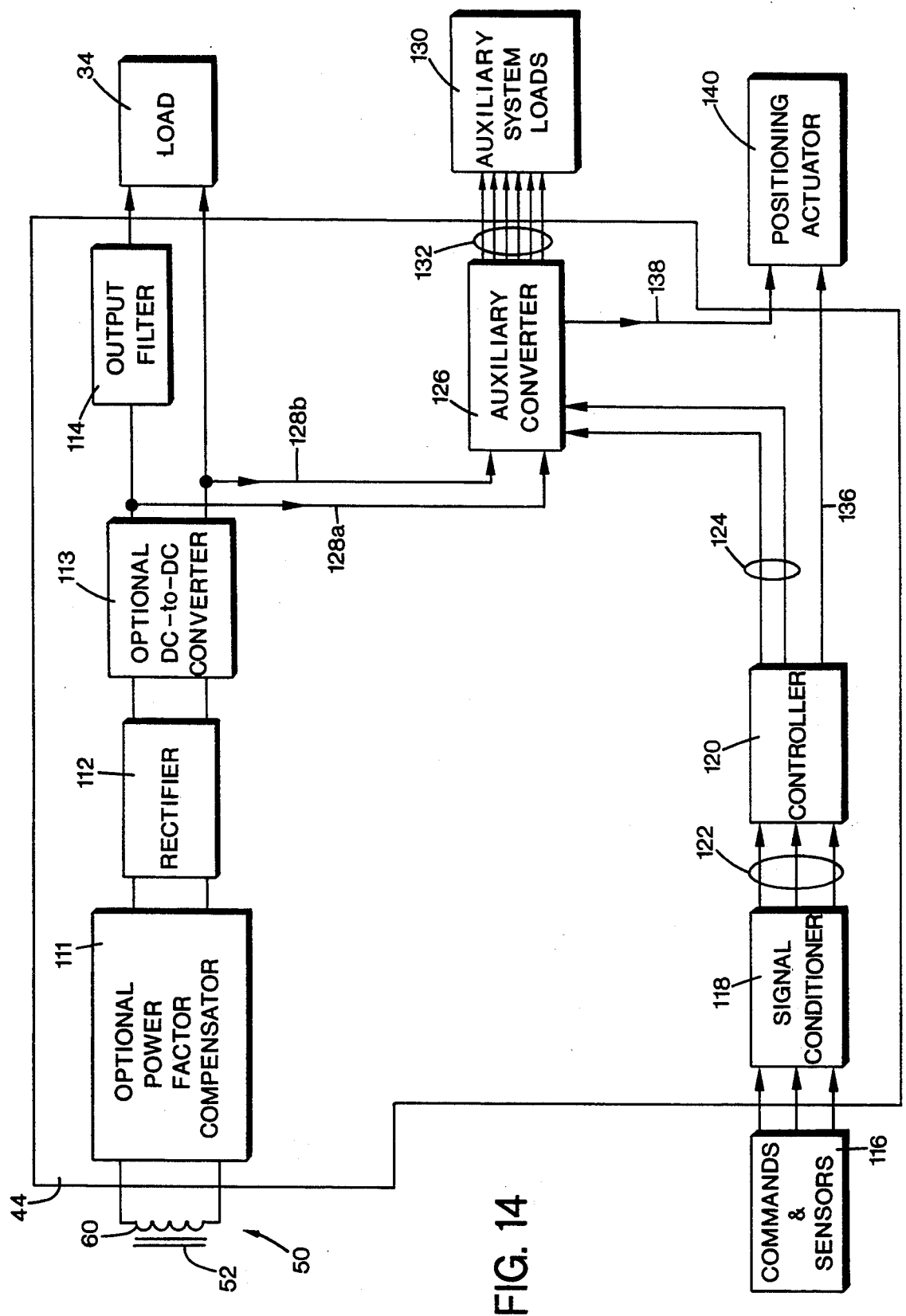
FIG. 14 is a schematic block diagram of one form of a secondary side converter of the present invention.

The secondary side converter 44 may be either one converter for each link member 56, 58 or two discrete converters, but for simplicity is shown in FIG. 14 for the mobile embodiment as a single converter 44. The converter 44 converts the high frequency power received by link 50 into a desired AC frequency or DC power as dictated by the needs of the load 34. The link 50 is shown schematically in FIG. 14 as a core 52 and secondary winding 60. As shown in FIG. 14, the secondary converter 44 has an optional power factor compensator 44, such as a power factor compensation circuit 111, and a rectifier, such as a full wave bridge rectifier 112 which may include an optional compensating filter (not shown), which are each well known in the art.

The optional power factor correction circuit 111 may include a capacitor circuit, such as a variable capacitor, coupled with the secondary winding 60. The power factor compensator 111 may be a simple capacitor or a power electronic circuit arranged to provide the desired power factor compensation. In some applications, it may be preferred to have the secondary side of the system 30 appear as merely a resistive load when viewed from the primary side, particularly from the AC source 32. This may be accomplished by adjusting the power factor compensator 111 to provide unity power factor, such as may be provided by a static VAR compensator (SVC).

The secondary converter 44 may also include an optional DC-to-DC converter, such as a DC to DC chopper 113, coupled across the DC output of rectifier 112. The chopper 113 may be a simple transistor switch having collector and emitter coupled across the output of rectifier 112. The chopper 113 matches the DC voltage from rectifier 112 to that required by the load 34.

In this embodiment, using a full wave bridge rectifier 112 provides a DC output which is fed through an output filter 114 and delivered to the load 34. The output filter 114 may make the secondary converter 44 appear to the load 34 as a current source. In some applications, the output filter 114 may be omitted and replaced by a capacitor (not shown) in parallel with the rectifier output, so the secondary converter 44 would appear to load 34 as a voltage source.

The secondary side converter 44 may also provide other outputs and functions, such as receiving inputs from other sensors and operator input commands 116 located on-board the load, such as for an electric vehicle (see FIG. 18). These sensor signals and commands are received by a signal conditioning unit 118. A controller 120 receives conditioned signals 122 from the signal conditioner 118 and operates to provide a control signal 124 to an auxiliary converter 126. The auxiliary converter 126 taps a portion of the DC power converted by rectifier 112 via conductors 128a and 128b and converts this power according to the control signal 124 to provide power to a variety of auxiliary system loads 130 via conductors 132.

Additionally, it is within the level of skill in the art to provide the secondary side converter 44 with various means to provide voltage boosts, frequency changes, phase changes, and inner loop control. As a further alternative embodiment, the secondary converter 44 could be similar to the primary converter of FIG. 13 to provide an AC output to load 34. Furthermore, the secondary side converter may also be modified (not shown) to provide two or more of these various outputs to load 34. If the power delivered or transferred by link 50 is at suitable voltage, current, phase and frequency levels, the secondary side converter 44 may be eliminated.

Figure 15:
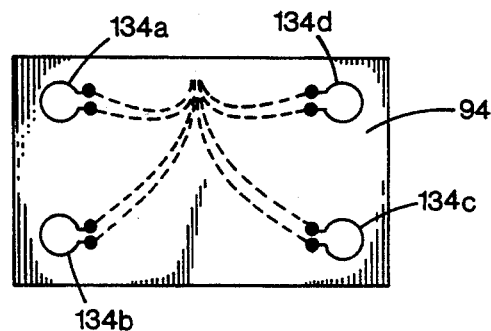
FIG. 15 is a side elevational view taken along line 15—15 of FIG. 8.

For a movable electric load 34' (see FIGS. 16-18), the output of link 50 may be optimized by maintaining the position of conductor 40 to be substantially colinear with the longitudinal axis Y of link 50. For example, the enhanced C-shaped cores of FIGS. 7 and 8 may have flux sensors mounted in the air gap faces 86, 86' and 94, 94'. FIG. 15 shows one manner of flush mounting four flux sensors 134a, 134b, 134c and 134d on surface 94 adjacent each corner. The flux sensors 134a–134d, such as simple ½" diameter loops of wire or Hall effect sensors, are inlaid substantially flush into the core material and bonded, such as by epoxy, in place. The Hall effect sensors are preferred for normal operating temperatures, and the wire loop sensors are preferred for high-temperature applications due to the sensitivity of the Hall effect sensors at high temperature.

The output from the flux sensors 134a–134d is an input to the sensor block 116 of FIG. 14. The flux sensor signal is conditioned by signal conditioner 118 and received controller 120. The controller processes the flux sensor signals from each of the core faces 94 and 94' or 86 and 86', and determines therefrom a positioning control signal 136. Positioning power 138 from auxiliary converter 126 and the positioning control signal 136 are provided to a positioning actuator 140, which may be similar to that shown in FIG. 16. The positioning actuator 140 then guides the link 50 for contactless power delivery along the path of travel.

E. Secondary Conductor

The secondary conductor 46 includes the generally tubular secondary winding 60 in the preferred embodiment located to the interior of core 52, and the balance of the secondary loop conductors, labeled generally as 46, required to delivery power from the secondary winding 60 to load 34. The effective inductance which increases linearly with the length of the secondary conductor 46 determines the relative importance of the proximity of the load 34 to link 50. Conceivably, the load 34 could be coupled directly with the secondary winding 60 and mounted adjacent to the core outer insulating layer 78, resulting in minimal secondary circuit inductance. In the illustrated embodiment, with the primary loop 40 operated in resonance based on the inductance of loop 40, including the load inductance, the secondary conductor inductance is desirably kept at a constant value, so as not to affect the resonant frequency $f_r$ of the power delivery system 30. Fortunately, this scheme is readily implemented and easily accomplishes the design goals of minimizing trailing cables and mobile hardware.

F. System-Based Design

The nature of the system-based design described herein is provided from a consideration of the various tradeoffs in the context of the overall performance of the contactless power delivery system 30. This section discusses those characteristics which are unique to the use of the link 50 with primary conductor 40, and which tend to impact the design of the overall system 30.

(1) Maintainability and Reliability

The contactless power delivery system 30 described herein advantageously has a forgiving nature with respect to the position of primary conductor 40. This feature greatly reduces the design demands on the system 30 in several ways, including, a reduction in physical stress of the primary cable, more lax performance requirements of the core position guide actuator (see FIG. 16) and increased insensitivity to abnormal conditions, discussed further below. Since the system performance is relatively insensitive to the position of primary conductor 40 within the interwinding region maintaining an exact position and tension of the primary conductor 40 is not required. Furthermore, exposed live conductors, as proposed in earlier systems, may be completely eliminated herein through the use of insulated cables.

(2) Economic Issues

The maintenance costs of the contactless power delivery system 30 may be much lower than the conventional metal-to-metal contact systems. The hardware of system 30 and the capital costs for installing the system are much lower than the costs associated with the previous contactless conduction systems such as the flat coil inductively coupled systems having a portion of the stationary core buried in the roadway (described in the background portion above). For the illustrated mobile contactless system 30, all of the core and secondary circuit portion is mobile, and only the primary conductor 40 remains stationary.

For example, the mobile core 52 uses the entire core during operation, whereas in contrast, the stationary buried core of the prior systems uses only a tiny fraction of the total core at any given time. The greatly reduced amount of core material used in system 30 renders it a far more economic system, particularly for electrical vehicle use (see FIG. 18). The losses in the primary loop increase with current density and conductor current, so higher efficiency units require either more conductor material or more core material, as seen in Equations 7–8.

Since the overall system losses increase with the current density and conductor current, a higher efficiency link 50 may require more conductor material or more core material. For example, in the cores having an air gap, larger secondary windings are required than for a gapless core unit.

As a further advantage of system 30, the controlled thyristor input of the primary converter 38 provides the capability for full regenerative energy recovery. For example, since the CWT may transfer power in either direction, regenerative energy recovery may be useful in elevators or tracked vehicles, such as trains, when traveling downhill or decelerating, where there is a surplus of energy which may be converted and delivered back to the source (see FIGS. 25 and 26).

(3) Abnormal Conditions

The contactless power delivery system 30 may be designed to withstand electrical faults and physical damage, including the ability to ride through minor system disturbances, and safely detect and protect the system from major problems. For example, in the event of a severe electrical fault in the high frequency system, a one-half cycle fault clearance time is much faster than at conventional frequencies, e.g., ½ cycle is 250 microseconds for an operating frequency of 2,000 Hz, which is compared to 8 milliseconds for 60 Hz.

An open circuit situation in the secondary conductor 46 forces the core 52 into extreme saturation and overheating, similar to conventional current transformers. Open circuit detection and protection may be provided by monitoring for over-voltage conditions, and upon detection thereof, switching in a fail-safe shunt circuit (not shown) to limit the secondary voltage to acceptable levels. An optional transformer (not shown) may be located between the AC source 32 and the primary converter 38 to provide electrical isolation of the primary loop 40 from the utility grid. Also, such an optional transformer may be used for voltage change to allow operation of the primary side converter 38 at optimal levels. Also optional transformers may be used on only the secondary or on both sides to operate each converter at desired values.

Abnormal conditions encountered by the system 30 also include various environmental and physical problems to which link 50 and conductor 40 may be subjected. The design of the link 50 and primary conductor 40 described herein has the following characteristics which enable the system to withstand such physical abuse:

(1) Insensitivity to location within the interwinding space 76 allows for as much physical protection material (not shown) as required;

(2) The relative motion and the large interwinding space 76 promote efficient heat removal from the link 50; and (3) The optional secondary converter 44 may be mounted in a suitable enclosure on a mobile load 34', and can be designed to be immune to heat, shock, and moisture as required for the particular application.

G. Potential Applications

Figure 17:
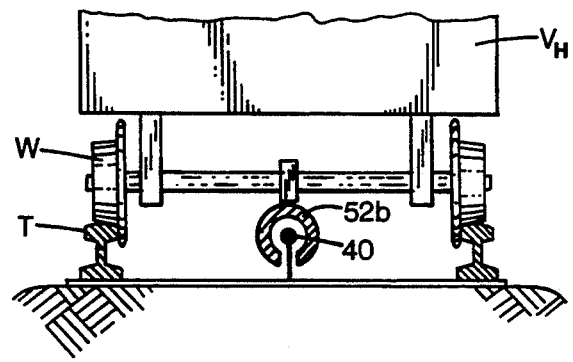
FIG. 17 is an elevational view of a portion of a movable electric load receiving power in accordance with the present invention.
Figure 16:
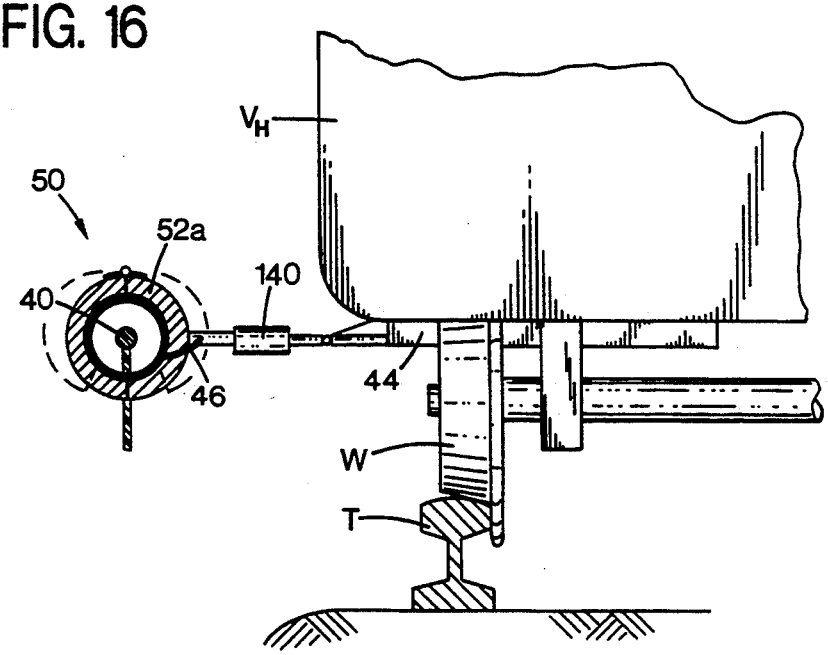
FIG. 16 is an elevational view of a portion of a movable electric load receiving power in accordance with the present invention.

Referring now to FIGS. 16-18 previously referred to, four applications are shown which may be useful in material handling, flexible power distribution, autonomous electric vehicles and recharge applications. Other applications of the contactless power delivery system 30 include elevators, the moving of palletized containers, shuttle cars, mobile conveyors, and moving face machinery, such as for mining applications and flexible power distribution systems. Furthermore, the system could be used to charge batteries, such as when a vehicle is parked in a parking garage or lot, and during breaks or loading time for moving equipment, such as shuttle cars.

Referring to FIGS. 16 and 17, a hauling vehicle $V_H$ for haulage and conveying of material or people may have wheels W designed to ride on rails or tracks T. Thus, the predetermined path of travel for the hauling vehicle $V_H$ is defined by the location of tracks T. FIG. 16 shows a gapless core 52a with link 50 supported from the hauling vehicle $V_H$ by a position actuator 140 used to substantially maintain the primary conductor 40 in colinear alignment with the link 50. FIG. 17 illustrates a C-shaped core which may be configured as shown in FIGS. 5, 7 or 8, but which for simplicity is illustrated as core 52b of FIG. 6.

FIG. 18 illustrates a plurality of autonomous vehicles, such as consumer-owned passenger vehicles or cars $V_{P1}$, $V_{P2}$ and $V_{P3}$. The vehicles $V_{P1}$ are receiving power from primary conductor 40 during recharging or during t receipt of operating or boost power. The vehicles $V_{P2}$ may be dual mode vehicles capable of operating either through receiving power from conductor 40 or through a battery backup or other power system. The vehicles $V_{P2}$ are shown with their links 50 retracted into a concealed position. It is apparent from FIG. 18, that implementation of the current system is quite feasible using existing roadways, for example, by locating the primary conductor 40 along a guardrail (to the left in the U.S. highway system), and allowing the electric vehicles to couple thereto, as shown for vehicles $V_{P1}$. With on-board battery storage, the autonomous electric vehicles $V_{P1}$ and $V_{P2}$ may operate either coupled or uncoupled to the primary loop 40. Furthermore, the primary conductor 40 may be used for electric "boost" during peak load periods, such as when a vehicle is climbing a hill, and the on-board battery could be used at other times.

Referring to 19, the contactless power delivery system 30 is configured as a power distribution system having a contactless clamp-on link 150, shown with components similar to that described for link 50 and further including the following features. The link 150 is separable for example by translational or pivotal motion, or other opening action, as illustrated in FIG. 19. A hinge 142 is used, for example, with a spring closure member 144 used to urge or bias the clamp-on embodiment into a closed position. Furthermore, a release latch mechanism 146 and handle 148 may be included for easy coupling and decoupling of the clamp-on link with primary conductor 40.

In a typical design, for a 100 kW load, a link 50 weighs approximately 14 kilograms. To "plug-in" a power tool with a rating of one kilowatt (1 kW) into the 500 Amp primary loop of the above example, requires a clamp-on link 150 having a weight of less than 0.2 kilograms. Furthermore, the clamp-on link 150 may be engaged with conductor 40 without exposing a user to live conductors, and without any sparks which may ignite hazardous material. The clamp-on link 150 may advantageously be used in lieu of conventional power center couplers. Furthermore, with an overhead mounting of the primary conductor 40, trailing cables to the portable loads such as 34, are minimized to reduce hazards to operating personnel.

A further advantage of using current source characteristics as described herein for feeding the primary cable 40 allows the use of series-connected loads 34, which may be coupled or uncoupled from the primary conductor 40 as required. This diverges significantly from conventional power distribution systems where multiple loads are typically connected in parallel. Using system 30, the load 34 may be clamped on at any location along the primary conductor 40, which advantageously provides a flexible power distribution system.

B. Prototype Operation

A laboratory prototype was constructed of the contactless power delivery system 30. A 2,000 Hz sinusoidal primary current provided 138 ampere-turns which were circulated in a primary loop 40 through a link 50 having dimensions as shown in Table 6.

TABLE 6

| Test Coaxial Winding Transformer Data | |
|---|---|
| K | 20.2 |
| length (cm) | 2.54 |
| height (cm) | 8.89 |
| width (cm) | 8.89 |
| Wgt (kg) | 0.557 |
| Vol (cm$^3$) | 92.5 |

Figure 20:
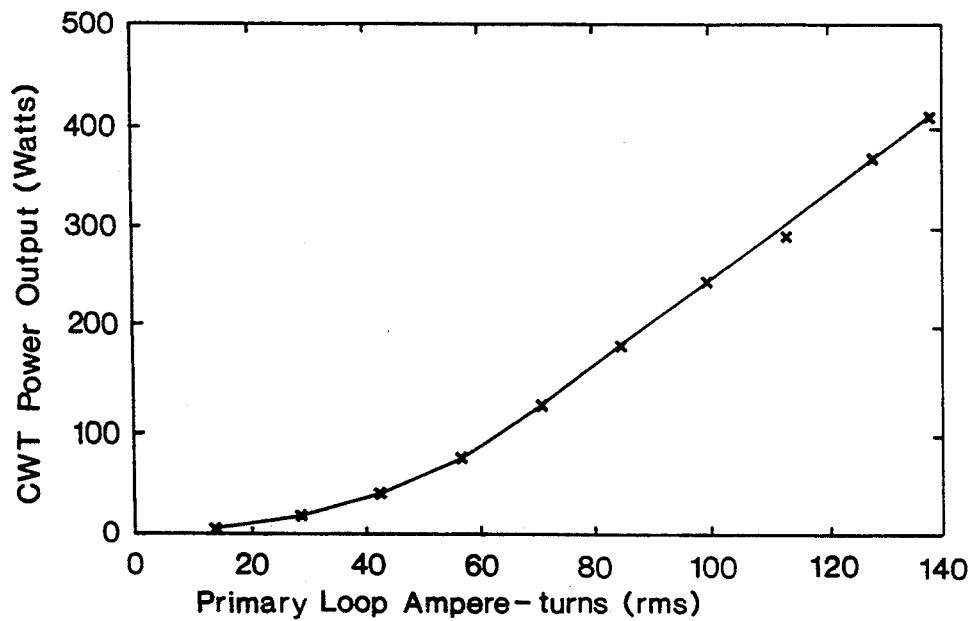
FIG. 20 is a graph of power transfer through a prototype unit constructed in accordance with the present invention.

The link 50 included a single toroidal core 52a constructed from 1 mil (0.001 inches) thick amorphous metallic glass tape encircling a copper tubular secondary winding 60 having a primary cable 40 inserted therethrough. The graph of FIG. 20 shows the data collected while increasing the primary loop current $i_1$ when the load resistance is at a fixed value. As expected, the power output initially increases quadratically with the current, then less than quadratically as the core material saturates. The output power test was limited by the laboratory power supply, with the core 52 at saturation voltage, but with much less than the maximum current capacity flowing therethrough. The data shows successful delivery of significant power to the secondary winding 60 using the link 50 as described.

Table 7 compares the theoretical expected values to the measured results for the power densities for the link dimensions and primary ampere turns actually used in the test.

TABLE 7

| Parameter | Laboratory Data | |
|---|---|---|
| | Theoretical | Measured |
| $P_{wgt\_dens}$ (kW/kg) | 0.80 | 0.75 |
| $P_{vol\_dens}$ (W/cm$^3$) | 5.9 | 5.6 |

Both of these parameters and the measured values correlate well with the theoretical values. Higher power levels may be achieved by increasing the core cross section to handle more voltage or by increasing the primary loop current, with a proportional decrease in the load impedance. The values are significantly lower than the design example, since high values of current were not achieved at 2,000 Hz with the available laboratory equipment. Since coaxial winding transformers generally have been tested at 50 kW in a 50 kHz system by two of the coinventors of the present invention, upscaling of the prototype unit tested is believed feasible (see the article by M. H. Kheraluwala, D. W. Novotny, D. M. Divan, "Design Considerations for High Frequency Transformers," IEEE-PESC-90 Record, pp. 734–742.

Thus, the use of a high frequency and a highly reactive primary cable loop 40 make the load resonant converter topology a preferred embodiment for the primary side converter 38. The overall contactless power delivery system 30 appears to be viable, as well as economically and operationally attractive for use in a variety of systems.

I. Alternate Embodiments

Figure 21:
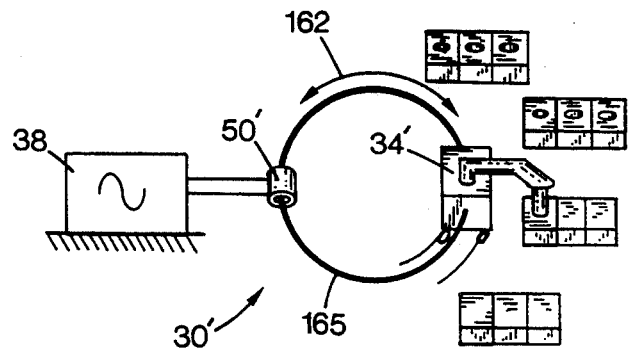
FIG. 21 is a combined schematic and perspective view of one form of an alternate contactless power delivery system of the present invention.
Figure 22:
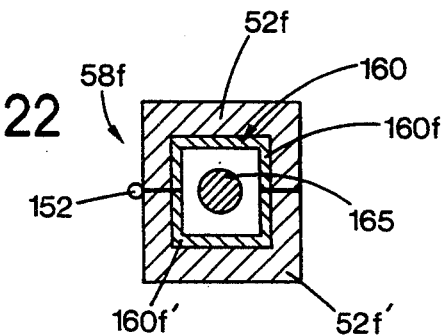
FIG. 22 is a radial sectional view of one form of an alternate split hinged coupling link of the present invention.

Referring to FIG. 21, an alternate embodiment of a contactless power delivery system 30' has a fixed primary converter 38 and a fixed link 50'. Although the link 50' is illustrated in FIG. 21 as a single link, it may also be a dual link similar to link 50 of FIGS. 1–4, and/or comprising a link member 58f as shown in FIG. 22. Link member 58f has a generally rectangular cross-section, and is merely shown as an alternate form of a link member. It is apparent that the generally circular link members and C-shaped link members discussed above may also be used in the embodiment of FIG. 21. The link member 58f has a split-hinged core with two hinged core members 52f and 52f' joined together by hinge 152. In the illustrated embodiment of FIGS. 21 and 22, the link 50' includes a primary conductor 160, shown split into two components 160f and 160f'.

In FIG. 21, the movable load 34' is illustrated as a robotic arm performing an operation on a variety of discreet elements by moving in a circular path indicated by arrow 162. Alternatively, the movable load 34' could move in a linear or other path, with a linear path embodiment being particularly well suited for a dual element link similar to that shown in FIGS. 1–4. In the system 30' power is transferred through link 50' to a moving secondary conductor 165 to supply power to the load 34' so the load may use the power to propel itself about the circular path as well as to perform other functions.

Figure 23:
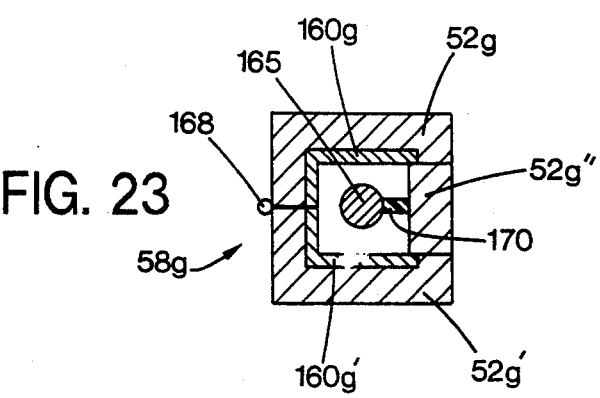
FIG. 23 is a radial sectional view of one form of a split hinged coupling link of the present invention having a segmented core with one core segment supported with the conductor and the other core segment supported with the moving conductor.

FIG. 23 illustrates an alternate embodiment of a link element 58g which may be used, for example, in system 30' of FIG. 21. The link element 52g includes three (3) core elements 52g, 52g', and 52g". In the illustrated embodiment, core elements 52g and 52g' are mirror images of one another and joined together by hinge 168. The primary conductor is split and includes conductor sections 160g and 160g'. Hinge 168 is optional since the core segments 52g and 52g' may be supplied as a single member united at the split adjacent hinge 168. Similarly, if hinge 168 is omitted, the primary winding segments 160g and 160g' could also be a single unitary piece.

In the embodiment of FIG. 21, core members 52g and 52g', and primary winding segments 160g and 160g' are fixed. The moving secondary winding 165 is mounted to core member 52g" by support 170 of an insulative material. In the illustrated embodiment of FIG. 21, the core member 52g" is an elongate member extending along the path of conductor 165. The insulative support 170 may be continuous, or a plurality of discrete members supporting the secondary conductor 165 from the core member 52g".

Figure 24:
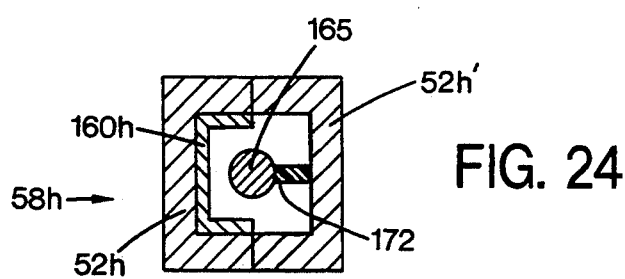
FIG. 24 is a radial sectional view of one form of a split coupling link of the present invention having a segmented core with one core segment supported with the conductor and the other core segment supported with the moving conductor.

FIG. 24 illustrates an alternate embodiment of link 50' for use in FIG. 21 configured as link member 58h. The illustrated link member 58h has a segmented core including core segments 52h and 52h'. A primary winding member 160h is secured to core segment 52h. In the illustrated embodiment of FIG. 21, the fixed portion of link 50' includes core segment 52h and primary conductor 160h. The moving secondary conductor 165 is supported from core segment 52h' by a support 172 of an insulative material. The insulative support 172 may be continuous, or a plurality of discrete members supporting the secondary conductor 165 from the core member 52h'. Together, the secondary conductor 165, support 172 and core segment 52h' form the movable portion of link 50' in the embodiment of FIG. 21.

Figures 25, 26:
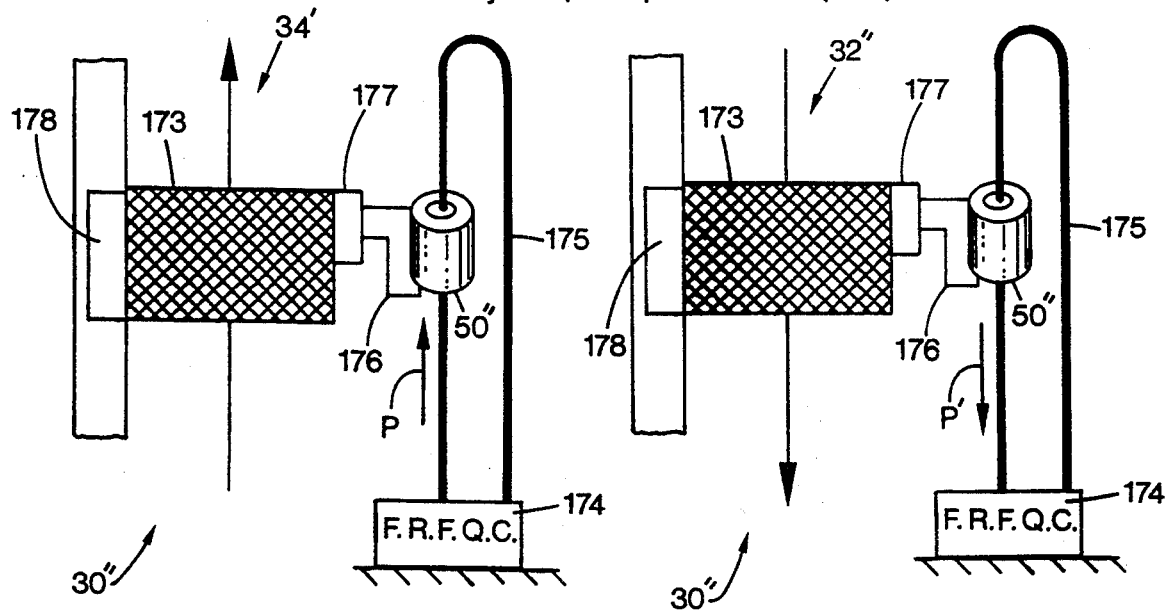
FIG. 25 is a combined schematic and perspective view of one form of another alternate contactless power delivery system of the present invention.
FIG. 26 is a combined schematic and perspective view of the contactless power delivery system of FIG. 25.

FIGS. 25 and 26 illustrate an alternate embodiment of a contactless power delivery system 30" having the capability for full regenerative energy recovery, since the CWT may transfer power in either direction. In FIG. 25, an elevator 173 receives power as indicated by arrow P from a fully regenerative four quadrant converter (labeled as "F.R.F.Q.C.") 174 through conductor 175 which functions as a primary winding. The link 50" is slidably coupled with the conductor 175 and delivers power received from conductor 175 via the conductor 176 to the second converter 177. The converter delivers the required power to a linear motor 178 which then raises the elevator 173 according to the elevator input commands (not shown). Thus, the linear motor 178 serves as the load 34' as elevator 173 travels upwardly.

In FIG. 26, when the elevator 173 travels downwardly, the linear motor 178 generates surplus power which is delivered to converter 177, which the functions as a primary converter. Power is delivered from the converter 177 to link 50" via conductors 176. The link 50 transfers energy as indicated by arrow P' to the now secondary conductor 175 for delivery to the "F.R.F.Q.C." 174, functioning as a secondary converter. Thus, the linear motor 178 of FIG. 26 serves as a mobile power source 32". Other examples of a regenerative energy recovery systems include tracked vehicle systems, such as trains, when traveling downhill or decelerating, where there is a surplus of energy which may be converted and delivered back to the source.

Figure 27:
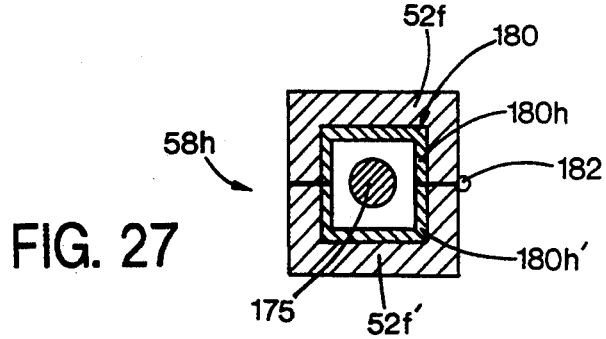
FIG. 27 is a radial sectional view of one form of an alternate split hinged coupling link of the present invention.

FIG. 27 illustrates one embodiment of a link member 58h which may be used for link 50" of FIGS. 25 and 26. The link member 58h has a hinged segmented core comprising core segments 52f and 52f', similar to FIG. 22. While the link element 58h of FIG. 27 is physically identical in construction to that of FIG. 22, it is shown herein to more clearly illustrate the manner of connection of link 50" of FIGS. 25 and 26, and to show the adaptability of the system to various applications. In the link member 58h, a primary winding is indicated generally at 180 is a split winding having primary segments 180*h* and 180*h'* which are mounted to the core elements 52*f* and 52*f'*, respectively. The core elements 52*f* and 52*f'*, as well as primary segments 180*h* and 180*h'*, are joined together by hinge 182.

While the embodiments of FIGS. 22, 23, 24 and 27 have been discussed with reference to the applications of FIGS. 21, 25 and 26 it is apparent that these alternate link element designs may be substituted for the embodiments discussed in FIGS. 1-4 above, as well for the various applications illustrated in FIGS. 16-19. Similarly, the link elements 58*a*-58*e* discussed above, as well as their structural equivalents, may be implemented in applications similar to those shown in FIGS. 21, 25 and 26.

J. Methods

Use of the present invention also offers several methods of transferring power from an electrical source to an electric load with relative motion therebetween. A method is also provided of delivering power between a first conductor and a second conductor, such as conductors 40 and 60 of FIGS. 1-4, without having direct electrical contact therebetween. The method includes the step of providing a first core-mounted conductor substantially surrounded by a core of a magnetic material. The first conductor has a passageway, such as that defined by the interwinding region 76, which is configured to receive the second conductor. The method includes the step of coupling the first conductor and core around a portion of the second conductor, and the step of energizing one of the first and second conductors to provide a current to the other of the first and second conductors to thereby transfer power between the first and second conductors. In a preferred embodiment, the power is transferred at a high frequency, with the specific frequency chosen depending upon the desired application and desirable use of the selected power electronics. In another illustrated embodiment, the first conductor and core member are split so they may be hinged and opened to receive the second conductor and closed thereafter to substantially surround the second conductor. In a preferred embodiment, there may be relative motion between the core and the second conductor enclosed within the core and primary conductor. This relative movement may be linear and/or rotational with respect to the second conductor, and the power transfer may be from the first conductor to the second conductor or in the opposite direction. In a preferred embodiment, multiple cores with first conductors are coupled to a single second conductor.

Having illustrated and described the principles of our invention with respect to several preferred embodiments, it should be apparent to those skilled in the art that our invention may be modified in arrangement and detail without departing from such principles. For example, other applications may be envisioned for employing the system described herein, as well as suitable material substitutions for the conductors and core, and dimensional variations for the components thereof, and the substitution of other devices and configurations known to be interchangeable by those skilled in the art. For instance, the flux collection or conduction surfaces adjacent a core gap, such as surfaces 84 and 84' of FIG. 5, need not be flat and need not be centered about a radius, but rather need only follow the same general contour, having approximately the same normal distance therebetween. Furthermore, the primary and secondary converters may be as described, or other devices known to be interchangeable by those skilled in the art may be used. We claim all such modifications falling within the scope and spirit of the following claims.

We claim:

1. A contactless power transfer system for transferring power from a power source to an electric load, comprising:
   a first conductor coupled to one of the power source or the electric load;
   a core-mounted conductor coupled to the other of the power source or the electric load, with the core-mounted conductor having an outer peripheral surface; and
   a magnetic core supporting the core-mounted conductor and substantially surrounding the outer peripheral surface, with both the core-mounted conductor and the magnetic core surrounding a portion of the first conductor so as to transfer power from the power source to the electric load.

2. A contactless power transfer system according to claim 1 wherein a portion of the first conductor is slidably received within the core-mounted conductor and magnetic core for relative motion therebetween, with power transfer continuing during the relative motion.

3. A contactless power transfer system according to claim 2 wherein:
   the first conductor has an axial length; and
   the relative motion occurs along the axial length of the first conductor.

4. A contactless power transfer system according to claim 2 wherein:
   the first conductor has a longitudinal axis; and
   the relative motion is rotational substantially about the longitudinal axis of the first conductor.

5. A contactless power transfer system according to claim 1 wherein:
   the first conductor is coupled to the power source; and
   the core-mounted conductor is coupled to the electric load.

6. A contactless power transfer system for transferring power from a power source to an electric load, comprising:
   a first conductor coupled to one of the power source or the electric load;
   a core-mounted conductor coupled to the other of the power source or the electric load; and
   a magnetic core supporting and surrounding a portion of the core-mounted conductor, with the core-mounted conductor and magnetic core surrounding a portion of the first conductor so as to transfer power from the power source to the electric load; and
   a first converter coupling the first conductor to the power source.

7. A contactless power transfer system according to claim 6 wherein the first converter includes a resonant converter.

8. A contactless power transfer system according to claim 6 wherein the first converter includes current source converter.

9. A contactless power transfer system according to claim 6 wherein the first converter includes a switched input stage rectifying power received from the power source, a high frequency current source inverter inverting the rectified power from the switched input stage into high frequency power received by the first conductor.

10. A contactless power transfer system according to claim 6 further including a second converter coupling the core-mounted conductor to the electric load.

11. A contactless power transfer system according to claim 1 wherein the magnetic core is separable into at least two core segments for selectively opening to receive and remove the first conductor, with the core segments being joinable to secure the first conductor therein.

12. A contactless power transfer system according to claim 1 wherein:
- a portion of the first conductor is movably received within the core-mounted conductor and magnetic core for relative motion therebetween during the power transfer; and
- the magnetic core comprises a gapless core.

13. A contactless power transfer system for transferring power from a power source to an electric load, comprising:
- a first conductor coupled to one of the power source or the electric load;
- a core-mounted conductor coupled to the other of the power source or the electric load;
- a magnetic core supporting and surrounding a portion of the core-mounted conductor, with the core-mounted conductor and magnetic core surrounding a portion of the first conductor so as to transfer power from the power source to the electric load, with a portion of the first conductor being movably received within the core-mounted conductor and magnetic core for relative motion therebetween during the power transfer;
- a position sensor for sensing the position of the core-mounted conductor relative to the position of the first conductor; and
- a positioning actuator responsive to the position sensor for positioning the core-mounted conductor in a selected position relative to the position of the first conductor.

14. A contactless power transfer system according to claim 13 wherein the selected position of the core-mounted conductor is substantially concentric about the first conductor.

15. A contactless power transfer system according to claim 13 wherein the position sensor comprises a flex sensor for sensing the core flux.

16. A contactless power transfer system according to claim 15 wherein the flux sensor comprises a wire loop.

17. A contactless power transfer system according to claim 15 wherein the flux sensor comprises a Hall effect sensor.

18. A contactless power transfer system for transferring power from a power source to an electric load, comprising:
- a first conductor coupled to one of the power source or the electric load;
- a core-mounted conductor coupled to the other of the power source or the electric load;
- a magnetic core supporting and surrounding a portion of the core-mounted conductor, with the core-mounted conductor and magnetic core surrounding a portion of the first conductor so as to transfer power from the power source to the electric load, with a portion of the first conductor being movably received within the core-mounted conductor and magnetic core for relative motion therebetween during the power transfer; wherein the core has two flux transferring faces separated by a gap, and the first conductor is mounted from a fixed insulative support member extending through the core gap; and
- the contactless power transfer system further includes a fixed magnetic core member attached to the fixed insulative support to magnetically link the two flux transferring faces together.

19. A contactless power transfer system according to claim 18 wherein:
- the fixed insulative support has a first axis;
- the fixed core member has a flux transferring surface substantially perpendicular to the insulative support first axis; and
- the two flux transferring faces of the core are substantially perpendicular to the insulative support first axis.

20. A contactless power transfer system according to claim 18 wherein:
- the fixed insulative support has a first axis;
- the fixed core member has two flux transferring surface substantially parallel to the insulative support first axis; and
- the two flux transferring faces of the core are substantially parallel to the insulative support first axis.

21. A contactless power transfer system according to claim 20 wherein the core-mounted conductor and the core are each split into first and second portions which are openable for disengaging the first conductor and closable for engaging the first conductor for power transfer therebetween.

22. A contactless power transfer system according to claim 18 further including:
- a position sensor for sensing the position of the core-mounted conductor relative to the position of the first conductor; and
- a positioning actuator responsive to the position sensor for positioning the core-mounted conductor in a selected position relative to the position of the first conductor.

23. A contactless power transfer system according to claim 22 wherein the position sensor comprises a flex sensor for sensing the core flux, the flux sensor being mounted in one of the two flux transferring faces of the core and the fixed core member.

24. A contactless power transfer system for transferring power from a power source to an electric load, comprising:
- a first conductor coupled to one of the power source or the electric load;
- a core-mounted conductor coupled to the other of the power source or the electric load;
- a magnetic core supporting and surrounding a portion of the core-mounted conductor, with the core-mounted conductor and magnetic core surrounding a portion of the first conductor so as to transfer power from the power source to the electric load, with a portion of the first conductor being movably received within the core-mounted conductor and magnetic core for relative motion therebetween during the power transfer;
- a fixed magnetic core member cooperating with the core to form a flux path through the core and the fixed core member; and
- an insulative support extending from the fixed core member and supporting the first conductor.

25. A contactless power transfer system according to claim 24 wherein the core has a gap which receives at least a portion of the fixed core member.

26. A contactless power transfer system according to claim 24 wherein the core and the fixed core member have substantially equal cross sectional areas.

27. A contactless power transfer system according to claim 24 wherein the relative motion occurs along a selected length of the first conductor, the contactless power transfer system further includes plural insulative supports along the first conductor selected length.

28. A contactless power transfer system according to claim 24 wherein the relative motion occurs along a selected length of the first conductor, and the insulative support extends along the first conductor selected length.

29. A contactless power transfer system according to claim 24 wherein the core-mounted conductor and the core are each split into first and second portions which are openable for disengaging the first conductor and closable for engaging the first conductor for power transfer therebetween.

30. A contactless power transfer system according to claim 1 wherein:
   a portion of the first conductor is movably received within the core-mounted conductor and magnetic core for relative motion therebetween during the power transfer; and
   wherein the core-mounted conductor and the core are each split into first and second portions which are openable for disengaging the first conductor and closable for engaging the first conductor for power transfer therebetween.

31. A contactless power transfer system according to claim 30 wherein the core-mounted conductor and the core first and second portions are pivoted together by a hinge member.

32. A contactless power transfer system according to claim 1 wherein:
   a portion of the first conductor is movably received within the core-mounted conductor and magnetic core for relative motion therebetween during the power transfer; and
   the magnetic core has an air gap.

33. A contactless power transfer system according to claim 32 wherein the magnetic core air gap is sized for passage of the first conductor therethrough.

34. A contactless power transfer system according to claim 1 wherein:
   the first conductor is fixed and coupled to the power source; and
   the core-mounted conductor moveable with respect to the first conductor during the power transfer, and the core-mounted conductor is coupled to the electric load.

35. A contactless power transfer system according to claim 1 wherein:
   the first conductor is fixed and coupled to the power source, the first conductor has power flow sending and return members lying side-by-side along a travel path; and
   the core-mounted conductor is coupled to the electric load and comprises a pair of core-mounted conductor segments, and the core comprises a pair of core segments one of each surrounding one of the core-mounted conductor segments, with one of the conductor segments surrounding a portion of one of the sending and return members and the other of the conductor segments surrounding a portion of the other of the sending and return members, with the pair of conductor segments moving side-by-side along the travel path during the power transfer.

36. A contactless power delivery system for delivering power to an electric load moving along a path, comprising:
   a primary conductor coupled to an AC power source; and
   a secondary conductor and magnetic core supported by and coupled to the movable electric load, the secondary conductor having an outer peripheral surface substantially surrounded by the magnetic core, with both the secondary conductor and the magnetic core substantially surrounding a portion of the primary conductor for receiving power therefrom as the electric load moves along the path.

37. A contactless power delivery system for delivering power to an electric load moving along a path, comprising:
   a primary conductor coupled to an AC power source; and
   a secondary conductor and magnetic core supported by and coupled to the movable electric load, the secondary conductor and magnetic core substantially surrounding a portion of the primary conductor for receiving power therefrom as the electric load moves along the path; and
   a primary converter coupling the primary conductor to the AC power source.

38. A contactless power delivery system according to claim 37 wherein the primary converter includes a series resonant converter.

39. A contactless power delivery system according to claim 37 wherein the primary converter includes current source converter.

40. A contactless power delivery system according to claim 37 wherein the primary converter includes a switched input stage rectifying power received from the AC source, a high frequency current source inverter inverting the rectified power from the switched input stage into high frequency AC primary power received by the primary conductor.

41. A contactless power delivery system according to claim 40 further including a primary transformer coupling the current source inverter to the primary conductor.

42. A contactless power delivery system for delivering power to an electric load moving along a path, comprising:
   a primary conductor coupled to an AC power source;
   a secondary conductor and magnetic core supported by and coupled to the movable electric load, the secondary conductor and magnetic core substantially surrounding a portion of the primary conductor for receiving power therefrom as the electric load moves along the path; and
   a secondary converter coupling the secondary conductor to the electric load.

43. A contactless power delivery system according to claim 42 wherein the secondary converter includes a power conditioner for conditioning the power received from the secondary conductor.

44. A contactless power delivery system according to claim 43 wherein:

the power conditioner includes a sensor monitoring the power received from the primary conductor; and the power conditioner is responsive to the monitoring of the sensor.

45. A contactless power delivery system for delivering power to an electric load moving along a path, comprising:

a substantially fixed longitudinal first conductor coupled to an AC power source; and a secondary coupling sheath supported by the movable electric load, the sheath having a second conductor with an outer peripheral surface and a magnetic core substantially surrounding outer peripheral surface of the second conductor, with the second conductor coupled to the electric load, the sheath substantially surrounding a portion of the first conductor and receiving power therefrom as the electric load moves along the path.

46. A contactless power delivery system for delivering power to an electric load moving along a path, comprising:

a substantially fixed longitudinal first conductor coupled to an AC power source, with the first conductor being supported by plural supports along the length thereof; and a secondary coupling sheath supported by the movable electric load, the sheath having a second conductor and a magnetic core surrounding the second conductor, with the second conductor coupled to the electric load, the sheath substantially surrounding a portion of the first conductor and receiving power therefrom as the electric load moves along the path, with the magnetic core comprising a substantially C-shaped core having an air gap to partially surround the first conductor, the air gap slidably receiving the first conductor plural supports therein as the electric load moves along the path.

47. A contactless power delivery system according to claim 45 wherein the magnetic core comprises a gapless core.

48. A contactless power delivery system according to claim 45 wherein the magnetic core includes two longitudinally separated portions, and the coupling sheath further includes a hinge joining together the two core portions for opening to radially couple and decouple the sheath with the first conductor.

49. A contactless power delivery system according to claim 48 wherein the hinge is biased into a close position for urging together the two core portions to substantially completely surround the first conductor when the sheath is coupled therewith.

50. A contactless power delivery system for delivering power to an electric load moving along a path, comprising:

a substantially fixed longitudinal first conductor coupled to an AC power source, with the first conductor being supported by plural supports along the length thereof; and a secondary coupling sheath supported by the movable electric load, the sheath having a second conductor and a magnetic core surrounding the second conductor, with the second conductor coupled to the electric load, the sheath substantially surrounding a portion of the first conductor and receiving power therefrom as the electric load moves along the path, with the magnetic core including two longitudinally separated portions openably joined together for momentarily opening to allow the plural supports to pass through a longitudinal gap defined between the two longitudinally separated core portions when open.

51. A contactless power distribution system for distributing power from an AC source to a portable electric load, comprising:

an elongate primary conductor coupled to an AC power source; and a secondary coupling sheath having a secondary conductor coupled to the portable electric load, with the secondary conductor having an outer peripheral surface, the sheath also having a magnetic core substantially surrounding the outer peripheral surface of the secondary conductor and being openable to couple and decouple the sheath to the primary conductor at any selected location along the length of the primary conductor, with both the secondary conductor and the core substantially surrounding a portion of the primary conductor when the sheath is coupled therewith to power the portable electric load.

52. A contactless power distribution system for distributing power from an AC source to a portable electric load, comprising:

an elongate primary conductor coupled to an AC power source; and a secondary coupling sheath having a secondary conductor coupled to the portable electric load, and a magnetic core surrounding the secondary conductor and being openable to couple and decouple the sheath to the primary conductor at any selected location along the length of the primary conductor, with the core substantially surrounding a portion of the primary conductor when the sheath is coupled therewith to power the portable electric load;

wherein the primary conductor is substantially fixed to power plural portable electric loads each having a secondary coupling sheath coupled at selected locations along the length of the primary conductor.

53. A contactless power distribution system according to claim 51 wherein the magnetic core has two longitudinally separated portions openably joined together to couple and decouple the sheath with the primary conductor.

54. A contactless power distribution system according to claim 53 wherein the two longitudinally separated portions of the magnetic core are joined together by a hinge for opening to radially couple and decouple the sheath with the primary conductor.

55. A contactless power distribution system according to claim 51 wherein the primary conductor is moveable between locations to provide temporary power for the portable electric load while moving between said locations.

56. A contactless power transfer system for transferring power from a power source to a moveable electric load, comprising:

a primary conductor system having a feeder conductor coupled to the power source, the primary conductor system also having plural fixed primary loops each coupled to the feeder conductor, each primary loop aligned with at least one other primary loop to extend along adjacent portions of a path of travel of the load; and a coupling sheath having a secondary conductor coupled to the load, the coupling sheath also having a magnetic core surrounding the secondary conductor, with the core for surrounding a portion of the one of the primary loops to receive power therefrom when moving along the path of travel adjacent said one of the primary loops.

57. A contactless power transfer system according to claim 56 wherein each primary loop is supported by at least one insulated support member, and the core has a gap for passing the insulated support member longitudinally therethrough when the load moves along the path of travel.

58. A contactless power transfer system according to claim 56 wherein the coupling sheath is openable to couple and decouple the sheath to each successive aligned primary loop as the load moves along the path of travel.

59. A coupling sheath, comprising:
a sheath conductor for surrounding a portion of an elongate power conductor, the sheath conductor for coupling to an electric load; and
a magnetic core surrounding the sheath conductor to provide a flux path for a magnetic flux induced therein when the sheath conductor and core surround the power conductor, said magnetic flux inducing a current flow within the sheath conductor to deliver power from the power conductor to a load when coupled therewith.

60. A coupling sheath according to claim 59 wherein the power conductor has an insulative cover layer, and the sheath conductor is sized to grip the power conductor insulative cover layer and substantially prevent motion of the coupling sheath along the length of the power conductor.

61. A coupling sheath according to claim 59 wherein the power conductor has an insulative cover layer, and the sheath conductor is sized to slidably move along the length of the power conductor.

62. A coupling sheath according to claim 61 wherein the sheath conductor has an inner surface facing the power conductor when coupled therewith, and the coupling sheath further includes an inner insulative cover layer of a low friction material along the inner surface of the sheath conductor.

63. A coupling sheath according to claim 62 wherein the inner insulative cover layer is of TEFLON ®.

64. A coupling sheath according to claim 59 further including a core covering of an insulative durable material surrounding the core.

65. A coupling sheath according to claim 64 wherein the core covering material is selected from one of the group consisting of a plastic and a resilient rubber.

66. A method of coupling an electric load to an AC power source, comprising the steps of:
powering an elongate conductor with the AC power source;
providing the electric load with a coupling sheath having a sheath conductor with an outer peripheral surface substantially surrounded by a magnetic core, the sheath conductor electrically coupled to the load; and
circumferentially substantially surrounding a portion of the elongate conductor with both the sheath conductor and the core to receive power therefrom by magnetic induction to power the load.

67. A method according to claim 66 wherein:
the providing step comprises providing a coupling sheath having a sheath conductor and core each split into two segments joined together for opening and closing; and
the surrounding step comprises opening the split segments of the sheath conductor and core to receive the elongate conductor and closing together said split segments to surround the elongate conductor.

68. A method according to claim 66 wherein:
the providing step comprises providing a coupling sheath having a core with a gap therein; and
the surrounding step comprises radially receiving the elongate conductor through the gap in the core.

69. A method of coupling an electric load to an AC power source, comprising the steps of:
powering an elongate conductor supported adjacent a fixed magnetic member with the AC power source;
providing the electric load with a coupling sheath having a sheath conductor surrounded by a magnetic core having two flux transferring surfaces, with the sheath conductor electrically coupled to the load;
surrounding a portion of the elongate conductor with the sheath conductor and core to receive power therefrom by magnetic induction to power the load; and
aligning the two flux transferring surfaces of the core with the fixed magnetic member.

70. A method according to claim 69 wherein:
the providing step comprises providing at least one of the two flux transferring surfaces of the core with a flux sensor; and
the method further includes the steps of:
monitoring the flux between the core and the fixed core member; and
adjusting the alignment of the core with the fixed magnetic member in response to the monitoring step.

71. A method according to claim 66 wherein the method further includes the step of moving the electric load along the length of the elongate conductor while receiving power therefrom.

72. A method of coupling an electric load to an AC power source, comprising the steps of:
powering an elongate conductor with the AC power source;
providing plural portable electric loads each electrically coupled to a coupling sheath, with each coupling sheath having a sheath conductor surrounded by a magnetic cored; and
surrounding different portions of the elongate conductor with each of the coupling sheaths to simultaneously power each portable electric load by magnetic induction.

73. A method of coupling an electric load to an AC power source, comprising the steps of:
powering an elongate conductor with the AC power source;
providing the electric load with a coupling sheath having a sheath conductor surrounded by a magnetic core, the sheath conductor electrically coupled to the load;
surrounding a portion of the elongate conductor with the sheath conductor and core to receive power therefrom by magnetic induction to power the load;

generating power with the electric load when moving along a portion of the elongate conductor;

delivering the generated power to the AC power source with the coupling sheath; and charging the AC power source with the generated power.

74. A method of coupling an electric load to an AC power source, comprising the steps of:

powering a sheath conductor coupled to the AC power source, with the sheath conductor having an outer peripheral surface substantially surrounded by a magnetic core;

providing an elongate conductor coupled to the load; and circumferentially substantially surrounding a portion of the elongate conductor with both the sheath conductor and the core to deliver power thereto by magnetic induction to power the load.

75. A method according to claim 74 wherein the method further includes the step of moving the AC power source along the length of the elongate conductor while delivering power thereto.

76. A method according to claim 74 wherein the method further includes the step of moving the electric load and sliding the length of the elongate conductor through the sheath conductor while receiving power therefrom.

77. A method of coupling an electric load to an AC power source, comprising the steps of:

powering one of an elongate conductor or a coupling sheath with the AC power source;

providing the electric load with the other of the elongate conductor or the coupling sheath;

with the coupling sheath having a sheath conductor surrounded by a magnetic core, the sheath conductor electrically coupled to one of the AC power source or the load, and with the coupling sheath being separable into at least two sheath segments; and separating the at least two sheath segments;

receiving a portion of the elongate conductor between at least two sheath segments; and joining together the at least two sheath segments to surround the portion of the elongate conductor with the coupling sheath to transfer power by magnetic induction from the AC power source to the load.

78. A method according to claim 77 wherein:

at least two of the sheath segments are separable and joinable by a relatively translational motion therebetween;

the separating step comprises sliding the at least two sheath segments apart from one another; and the joining step comprises sliding the at least two sheath segments together.

79. A method according to claim 77 wherein:

at least two of the sheath segments are pivoted together to be pivotally separable and joinable;

the separating step comprises pivotally separating the at least two sheath segments apart from one another; and the joining step comprises pivotally joining the at least two sheath segments together.

80. A method according to claim 77 wherein:

at least two of the sheath segments are radially separable and joinable by a relatively translational motion therebetween in radial directions respectively away from and toward a longitudinal axis of the received portion of the elongate conductor;

the separating step comprises moving the at least two sheath segments substantially radially apart from one another; and the joining step comprises moving the at least two sheath segments together substantially radially toward the elongate conductor.

81. A method according to claim 77 further including, between the separating and receiving steps, the step of inserting the portion of the elongate conductor between the separated at least two sheath segments.

82. A contactless power transfer system according to claim 1 wherein the core-mounted conductor and the core are each separated into first and second segments which are translationally openable for disengaging the first conductor and translationally closable for engaging the first conductor for power transfer therebetween.

83. A contactless power transfer system according to claim 1 wherein the core-mounted conductor and the core are each separated into first and second segments which are radially openable for disengaging the first conductor and radially closable for engaging the first conductor in radial directions respectively away from and toward a longitudinal axis of the surrounded portion of the first conductor.

84. A contactless power delivery system according to claim 45 wherein the secondary coupling sheath is separable into at least two sheath segments which are translationally openable for disengaging the first conductor and translationally closable for engaging the first conductor for power transfer therebetween.

85. A contactless power delivery system according to claim 45 wherein the secondary coupling sheath is separable into at least two sheath segments which are radially openable for disengaging the first conductor and radially closable for engaging the first conductor in radial directions respectively away from and toward a longitudinal axis of the surrounded portion of the first conductor.

86. A contactless power distribution system according to claim 51 wherein the magnetic core has two separable portions which are translationally openable for coupling and decoupling the sheath with the primary conductor.

* * * * *